United States Patent
Gao et al.

(10) Patent No.: US 11,225,414 B2
(45) Date of Patent: Jan. 18, 2022

(54) PAPER BALL-LIKE GRAPHENE MICROSPHERE, COMPOSITE MATERIAL THEREOF, AND PREPARATION METHOD THEREFOR

(71) Applicant: HANGZHOU GAOXI TECHNOLOGY CO., LTD., Hangzhou (CN)

(72) Inventors: Chao Gao, Hangzhou (CN); Chen Chen, Hangzhou (CN); Yi Han, Hangzhou (CN)

(73) Assignee: HANGZHOU GAOXI TECHNOLOGY CO., LTD., Hangzhou (CN)

( * ) Notice: Subject to any disclaimer, the term of this patent is extended or adjusted under 35 U.S.C. 154(b) by 108 days.

(21) Appl. No.: 16/622,953

(22) PCT Filed: Feb. 26, 2018

(86) PCT No.: PCT/CN2018/077221
§ 371 (c)(1),
(2) Date: Dec. 16, 2019

(87) PCT Pub. No.: WO2018/196474
PCT Pub. Date: Nov. 1, 2018

(65) Prior Publication Data
US 2020/0223699 A1    Jul. 16, 2020

(30) Foreign Application Priority Data

| Apr. 28, 2017 | (CN) | ......................... | 201710293102.0 |
| Apr. 28, 2017 | (CN) | ......................... | 201710294360.0 |
| Apr. 28, 2017 | (CN) | ......................... | 201710294376.1 |
| May 3, 2017 | (CN) | ......................... | 201710302898.1 |
| May 3, 2017 | (CN) | ......................... | 201710302912.8 |
| May 3, 2017 | (CN) | ......................... | 201710302915.1 |
| May 3, 2017 | (CN) | ......................... | 201710302916.6 |
| May 3, 2017 | (CN) | ......................... | 201710302917.0 |

(51) Int. Cl.
*C01B 32/184* (2017.01)
*C01B 32/198* (2017.01)
(Continued)

(52) U.S. Cl.
CPC .......... *C01B 32/184* (2017.08); *C01B 32/198* (2017.08); *C08J 3/203* (2013.01); *C08K 3/042* (2017.05); *C08K 7/24* (2013.01); *C09D 7/61* (2018.01); *C09D 7/68* (2018.01); *C09D 7/69* (2018.01); *C09D 7/70* (2018.01); *C09D 133/00* (2013.01); *C10M 103/02* (2013.01); *C10M 111/02* (2013.01); *C10M 117/02* (2013.01); *C01B 2204/02* (2013.01); *C01B 2204/30* (2013.01); *C01B 2204/32* (2013.01);
(Continued)

(58) Field of Classification Search
CPC ............ C01B 2204/02; C01B 2204/30; C01B 2204/32; C01B 32/182; C01B 32/184; C01B 32/198; C01P 2004/02; C01P 2004/34; C01P 2004/61; C01P 2004/62; C01P 2006/62; C01P 2006/10; C01P 2006/12; C08J 3/203; C08K 2201/005; C08K 2201/006; C08K 2201/011; C08K 3/042; C08K 7/24; C09C 1/46; C09D 133/00; C09D 7/61; C09D 7/68; C09D 7/69; C09D 7/70; C10M 103/02; C10M 111/02; C10M 117/02; C10M 125/02; C10M 2201/04; C10M 2201/0413; C10M 2203/003; C10M 2207/1256; C10M 2207/1265; C10N 2010/02; C10N 2020/06; C10N 2030/06; C10N 2050/10; H01M 4/583; Y02E 60/10
See application file for complete search history.

(56) References Cited

U.S. PATENT DOCUMENTS

2015/0155553 A1    6/2015    Cho et al.

FOREIGN PATENT DOCUMENTS

| CN | 101921650 A | 12/2010 |
| CN | 101928457 A | 12/2010 |

(Continued)

OTHER PUBLICATIONS

CN105540573B—A kind of more fold dry state graphene oxide microballoons of highly dissoluble and preparation method thereof—Google Patents English Translation (Year: 2016).*

(Continued)

*Primary Examiner* — Ellen M McAvoy
*Assistant Examiner* — Chantel L Graham

(57) ABSTRACT

The present invention provides a paper ball-like graphene microsphere, a composite material thereof, and a preparation method therefor. Such paper ball-like graphene microspheres are obtained by chemically reducing graphene oxide microspheres to slowly remove oxygen-containing functional groups on the surface of the graphene oxide to avoid the volume expansion caused by rapid removal of the groups, thereby maintaining a tight bond between graphene sheets without separation; and removing the remaining small number of oxygen-containing functional groups and repairing defect structures in the graphene oxide sheets by means of high temperature treatment, such that the graphene structure becomes perfect at an ultrahigh temperature (2500 to 3000° C.), thereby further improving the bonding ability between the graphene sheets in the microspheres and achieving a dense structure.

17 Claims, 3 Drawing Sheets

(51) Int. Cl.
  *C10M 111/02*   (2006.01)
  *C10M 103/02*   (2006.01)
  *C10M 117/02*   (2006.01)
  *C08K 3/04*   (2006.01)
  *C08K 7/24*   (2006.01)
  *C08J 3/20*   (2006.01)
  *C09D 7/61*   (2018.01)
  *C09D 7/40*   (2018.01)
  *C09D 133/00*   (2006.01)
  *C10N 50/10*   (2006.01)

(52) U.S. Cl.
  CPC ...... *C01P 2004/02* (2013.01); *C01P 2004/34* (2013.01); *C01P 2004/61* (2013.01); *C01P 2004/62* (2013.01); *C08K 2201/005* (2013.01); *C08K 2201/006* (2013.01); *C08K 2201/011* (2013.01); *C10M 2201/0413* (2013.01); *C10M 2203/003* (2013.01); *C10M 2207/1265* (2013.01); *C10N 2050/10* (2013.01)

(56) References Cited

FOREIGN PATENT DOCUMENTS

| CN | 101993065 | A |   | 3/2011 |
| --- | --- | --- | --- | --- |
| CN | 103204497 | A |   | 7/2013 |
| CN | 104419286 | A |   | 3/2015 |
| CN | 104560289 | A |   | 4/2015 |
| CN | 104560290 | A |   | 4/2015 |
| CN | 105540573 | A |   | 5/2016 |
| CN | 105845952 | A | * | 8/2016 |
| CN | 106118826 | A |   | 11/2016 |
| CN | 106185904 | A |   | 12/2016 |
| CN | 106241778 | A |   | 12/2016 |
| CN | 106317505 | A |   | 1/2017 |
| CN | 106541778 | A |   | 3/2017 |
| CN | 105540573 | B | * | 12/2017 |

OTHER PUBLICATIONS

International Search Report issued in corresponding International application No. PCT/CN2018/077221, dated May 3, 2018.

Written Opinion of the International Searching Authority for No. PCT/CN2018/077221.

Xuan Dou et al., "Self-dispersed crumpled graphene balls in oil for friction and wear reduction", journal, Feb. 9, 2016, 6 pages, vol. 113, Northwestern University, etc.

* cited by examiner

PAPER BALL-LIKE GRAPHENE MICROSPHERE, COMPOSITE MATERIAL THEREOF, AND PREPARATION METHOD THEREFOR

TECHNICAL FIELD

The present invention relates to the technical field of graphene material, and particularly to a paper ball-like graphene microsphere, a composite material thereof, and a preparation method therefor.

BACKGROUND

As a new two-dimensional carbon material, graphene has attracted more and more attention. Due to the outstanding mechanical, electrical and thermal performances and unique electromagnetic performance, graphene has broad prospects of application in many fields and has gradually put into practical use. There have been many reports that compounding graphene with a polymer can significantly improve the tensile strength, Young's modulus, and bending strength of the material. The reinforcement mechanism is mainly to improve the overall mechanical properties of the composite material by transferring the stress to graphene by taking advantage of the superior mechanical strength of graphene. Many forms of graphene are available for use, including graphene films, graphene aerogels, graphene powders, graphene fibers, and so on, which often exhibit different reinforcing effects. For example, compounding graphene aerogel with a polymer material can effectively improve the electrical and thermal conductivity of the polymer material. In a conventional graphene composite, flake-like graphene has limited improvement on the impact performance and lacks a reinforcement mechanism, thus being unsuitable for use as an effective toughener. If graphene is made to have a spherical shape, the mechanical strength can be fully used, so a unique prospect of application is exhibited in improving the impact performance, wear resistance, elastic resilience, and the like.

In Chinese Patent No. C" 201010593157.1 entitled "Method for preparing graphene powder", a non-expanded graphene powder is obtained by atomization drying and following thermal treatment with a slow heating rate. The method is simple and can be used to prepare the graphene powder in large quantities. However, there is still gas release during direct heat treatment, which causes the graphene to partially expand. In Chinese Patent No. CN201310131014 entitled "Method for preparing graphene material and its use in chemical energy storage and/or conversion", by adding a substance that can react, polymerize or decompose to a graphene oxide dispersion, a kind of powder having a porous structure is obtained after reduction, which is beneficial to the application in the field of electrochemical energy storage. However, how to obtain a pleated microspherical graphene material that does not expand or even shrink is still of great difficulty.

The friction phenomenon is widely present in mechanical motion, causing energy loss, reduced efficiency, elevated temperature, worn surface, decreased performance, and shortened life of the machine. Due to the abrasive wear caused by a rubbing pair in friction, and energy loss and heat generation caused by friction, the machine is prone to breakdown or even failure, bringing economic loss to people's lives and even physical danger. Lubricating oil is one of the important means to effectively reduce the loss of mechanical energy and abrasive wear. After adding the lubricating oil, the effects of lubrication and wear reduction, temperature lowering and cooling, washing and cleaning, sealing and leakage prevention, rust and corrosion prevention, shock absorption and buffeting can be achieved. Conventional lubricating oils are a mixture of a base oil with various auxiliary agents. The base oil includes mineral oil, biomass oil, and synthetic oil. The auxiliary agents are used to improve the properties of the base oil.

Graphene has an ultra-thin sheet structure (easy access to frictional contact surfaces), excellent mechanical and self-lubricating properties. These characteristics have attracted attention in the research of use as a lubricant additive. Numerous studies have found that use of an appropriate amount of graphene as a lubricant additive can not only lower the friction coefficient, but also significantly improve the bearing wear resistance of the lubricating oil by means of a friction adsorption film. However, graphene is prone to agglomeration in a lubricating oil, which affects its dispersion stability in the lubricating oil and solvent. At present, two main methods are available to solve the dispersion stability of graphene in lubricating oil and solvents such as water. One is to add a dispersing agent and utilize the dispersing effect of the dispersing agent to disperse graphene uniformly and stably in the solvent. However, the dispersing agent sometimes affects the exertion of the tribological behaviors of graphene. The other method is to functionalize the graphene to increase the dispersion stability of graphene in solvents, in which the selection of functional molecules is critical. However, regardless of the addition of a dispersing agent or surface modification, new components are additionally introduced, bringing a complicated effect on the overall performance of the lubricating oil.

The rapid development of the machinery industry has led to the upgrading of the grease industry. The calcium-based greases used earlier are used at a relatively low temperature, and thus not suitable for use in high-speed applications. The sodium-based greases and barium-based greases that are developed later are not ecologically friendly and have poor water resistance, so they have not got wide use. The following lithium-based greases, lithium stearate or 12-hydroxylithium-based greases developed have high working temperature, low friction coefficient, good lubrication performance, high water resistance, and other the characteristics, allowing the lithium-based grease to be widely used in the automotive industry. However, with the rapid development of automotive technology, high-performance automobiles have imposed more stringent requirements on lithium-based greases, and lithium complex-based greases emerge accordingly. Lithium complex-based grease has high dropping point and high temperature resistance. The fiber structure of the complex soap has high strength, resulting in good mechanical stability at high temperatures, long service life, and good water resistance. During the use of an ordinary lithium complex-based grease, although it exhibits certain advantages over lithium-based grease, it is difficult to meet the requirements for use due to the poor friction reduction capability and abrasion resistance. In order to meet the requirements of harsh conditions, the performance needs to be further improved.

Rubber has unique high elasticity at room temperature, light weight and wide use. As an important strategic material, it is widely used in the fields of national economy, high technology and national defense. However, simple rubber has low strength and modulus, poor wear resistance, poor fatigue resistance, and no utility, so most rubbers need to be reinforced with fillers. Carbon black (CB) and white carbon black ($SiO_2$) are main traditional reinforcing agents for rubbers. They are widely used in various rubber products. Although the rubber is reinforced, the inherent viscoelastic hysteresis loss of the rubber material and the friction between the fillers and polymer chains inside the rubber cause the rubber products used in a dynamic environment to generate a lot of heat. When the generated heat cannot be conducted out in time, the temperature inside the rubber rises sharply, causing its performance to deteriorate. This requires increasing the thermal conductivity of the rubber product to improve its performance and service life during dynamic use. Previously, nanofillers are compounded with rubbers by many researchers to obtain compounded rubbers with better performances. For example, fullerenes, montmorillonite, expanded graphite, and carbon nanotubes are added. However, these materials tend to agglomerate, are difficult to disperse in a high-viscosity system such as rubber, and cannot achieve a balance between various properties, so the scope of application is narrow.

Waterborne coatings still suffer from the defects such as poor paintability, poor touch feeling, low strength, and lack of wear resistance, which limit their application. Graphene is a two-dimensional carbon material with atomic thickness. It has an extremely high specific surface area, excellent mechanical properties, high thermal conductivity, and self-lubricating property. In recent years, graphene is combined with coatings by many researchers to improve various indicators of waterborne coatings by using the excellent properties of graphene. However, flake-like graphene tends to agglomerate to form a stacked graphite structure, by which the excellent performance of graphene cannot be achieved on one hand, and the dispersion stability is reduced on the other hand. In Patent No. 201510518720.1 entitled "Graphene-containing high-performance waterborne acrylate coating and preparation method and use thereof", the tensile strength and thermal conductivity are greatly improved by adding sulfonated graphene to a waterbore acrylate coating. In Patent No. 201610353311.5 entitled "Graphene/Acrylic Electrostatic Conductive Coating and Preparation Method thereof", a similar method is used to add graphene to an acrylic coating to improve the conductivity and acid fog resistance.

Among the five major engineering plastics, nylon has the largest output, the highest varieties, and the widest use. It has the advantages of high mechanical strength, high melting point, wear resistance, oil resistance, and excellent heat resistance, thus being widely used in automotive, electronic and electrical, mechanical and other fields. Since higher requirements are raised for the toughness of nylon in many fields of applications, nylon needs to be toughened to satisfy these applications. In general, three main methods are available for toughening nylon, including toughening with an elastomer, toughening with inorganic rigid particles and toughening with organic rigid particles. Elastomers can significantly improve the toughness of nylon materials, but they will greatly reduce the rigidity and strength of the materials at the same time. Inorganic rigid particles and organic rigid particles can both strengthen and toughen the materials, but the toughening effect is limited. Moreover, it is found through research that the morphology of rigid particles affects the toughening effect on the matrix. Among the rigid particles with flaky, spherical, and needle-like structures, the rigid particles with spherical structures have the optimum toughening effect on materials.

SUMMARY

In view of the defects existing in the prior art, the present invention provides a paper ball-like graphene microsphere, a composite material thereof, and a preparation method therefor. The following technical solutions are adopted in the present invention.

Solution I

A paper ball-like graphene microsphere comprises pleated single-layer graphene sheets, and has a diameter of 500 nm-5 μm, a density of 0.2-0.4 g/cm$^3$, a carbon/oxygen ratio of 20-60, and a specific surface area of less than 200 m$^2$/g.

A method for producing a paper ball-like graphene microsphere comprises the following steps:

(1) drying a single-layer graphene oxide dispersion by atomization drying to obtain graphene oxide microspheres;

(2) reducing the graphene oxide microspheres obtained in Step (1) under a reducing gas atmosphere to obtain reduced graphene oxide microspheres; and (3) subjecting the reduced graphene oxide microspheres obtained in Step (2) to high-temperature treatment at a temperature that is higher than 1000° C., to obtain ball-like graphene microspheres.

Further, the single-layer graphene oxide dispersion in Step (1) comprises a reducing agent; and during the atomization process, the graphene oxide sheet is pleated, and the reducing agent is attached to the surface of the sheet in a molecular form. The reducing agent is hydrogen iodide, hydrogen bromide, hydrazine hydrate, vitamin C, sodium borohydride or the like, and the weight ratio of the reducing agent to the single-layer graphene oxide is 0.1 to 10. The atomization drying temperature is 100 to 200° C., so that the graphene oxide is preliminarily reduced by the reducing agent encapsulated in the pleated structure.

Further, the reducing gas atmosphere in Step (2) is one or more of hydrazine hydrate vapor, hydroiodic acid vapor, hydrogen, and hydrobromic acid vapor. The reduction process is conducted under 60-200° C. for 30 min to 48 h.

Further, the temperature for high-temperature treatment in Step (3) is 2500 to 3000° C., and the atmosphere is one of nitrogen, helium, a mixture of hydrogen and argon, and argon, and the treatment time is 30 min to 48 h.

The beneficial effects are as follows. In the present invention, graphene oxide microspheres are firstly produced by atomization drying. Before atomization drying, the reducing agent is added to the graphene oxide dispersion and uniformly mixed, so that the reducing agent is loaded onto the surface of the graphene oxide sheet on molecular level. Then, during the atomization drying process, a part of the reducing agent reacts with the oxygen-containing functional groups on the surface of the graphene oxide, the product is released with the volatization of the solvent, and the remaining reducing agent is attached to the surface of the graphene oxide sheet in a molecular form, and is encapsulated as the sheet is pleated. Chemical reduction is adopted in the second step. Under a reducing gas atmosphere, the oxygen-containing functional groups inside and on the surface of the graphene oxide microspheres are fully reacted with the reducing agent, and a lower temperature results in the slow generation and release of gas, thereby avoiding the sharp volume expansion caused by the gas generation in rapid removal of the groups in the direct thermal reduction, whereby the graphene is still tightly bonded in the form of a pleated sheet without separation. The high-temperature thermal reduction in the third step removes the remaining small number of oxygen-containing functional groups and repairs the defect structures in the graphene oxide sheet on one hand; and removes the residual moisture, reduction products and unreacted reducing agent in the microspheres on the other hand. In addition, it is unexpectedly found in the experiment that at an extremely high temperature (2500-3000° C.), the diameter of the graphene microspheres gradually declines, the density is increased, and the specific surface area is lowered. This may be due to the perfection of the graphene sheet structure at the graphitization temperature, which allows the bond between the graphene pleats to rise, the force between the graphene sheets to increase, and the distance therebetween to decrease, so that the structure of the graphene sphere is gradually densified.

The resulting paper ball-like graphene microspheres have a more compact structure. The compact paper ball-like graphene microspheres have good mechanical properties and elasticity, can effectively absorb impact, and has high stability, lower density and better reinforcing effect compared with conventional reinforcing fillers.

Solution II

A graphene-based lubricating oil comprises the following components in parts by weight: 100 parts of a base oil, 0.05 to 1 part of paper ball-like graphene microspheres, and 2 to 14 parts of additional auxiliary agents. The paper ball-like graphene microsphere comprises pleated single-layer graphene sheets, and has a diameter of 500 nm-5 μm, a density of 0.2-0.4 g/cm$^3$, a carbon/oxygen ratio of 20-60, and a specific surface area of less than 200 m$^2$/g.

A method for producing a graphene-based lubricating oil comprises the following steps:

(1) adding paper ball-like graphene microspheres and additional auxiliary agents to a base oil, and stirring until uniform, where the additional auxiliary agents comprises: 0.5 to 1 part of a dispersant, 0.5 to 1.5 parts of a compatilizer, 0.3 to 1 part of a viscosity modifier, 0.2 to 0.5 part of an antifoaming agent, and 0.5 to 10 parts of a preservative; and (2) ultrasonically dispersing the mixture obtained in Step (1) and defoaming.

The beneficial effects are as follows. The obtained paper ball-like graphene microsphere has a more compact structure. The compact paper ball-like graphene microspheres have good mechanical properties and elasticity, can effectively absorb impact, and has high stability. When an external force is applied, the graphene microspheres are amenable to rolling friction on a friction surface, and the graphene microspheres can be filled into the worn region under extreme pressure to reduce further abrasive wear, thus significantly improving the wear resistance and friction reduction capability of the lubricating oil.

Solution III

A lithium complex-based grease comprising paper ball-like graphene microspheres comprises the following components in parts by weight: 70-90 parts of a base oil, 5-20 parts of a lithium complex-based thickener, 0.05-5 parts of paper ball-like graphene microspheres, and 1-5 parts of additional auxiliary agents. The paper ball-like graphene microsphere comprises pleated single-layer graphene sheets, and has a diameter of 500 nm-5 μm, a density of 0.2-0.4 g/cm$^3$, a carbon/oxygen ratio of 20-60, and a specific surface area of less than 200 m$^2$/g.

The additional auxiliary agents include: 0.5-2 parts of an antioxidant, 0-2 parts of a surfactant, and 0.5-1 parts of a rust inhibitor.

Further, the lithium complex-based thickener is a complex of a large molecular acid and a small molecular acid reacted with lithium hydroxide, where the large molecular acid is a $C_{12}$-$C_{24}$ fatty acid, the small molecular acid is a $C_1$-$C_{12}$ fatty acid or boric acid, and the molar ratio of the large molecular acid to the small molecular acid is 1:0.1-2.

A method for preparing a lithium complex-based grease comprising paper ball-like graphene microspheres comprises the following steps:

(1) mixing paper ball-like graphene microspheres, a base oil, a large molecular acid, and a small molecular acid, heating to 70-100° C., and then adding lithium hydroxide for saponification; and (2) heating the mixture obtained in Step (1) to 160-180° C., dehydrating, then heating to 190-220° C. for refining, cooling, adding additional auxiliary agents and the remaining base oil, mixing, and grinding, to obtain a lithium complex-based grease comprising paper ball-like graphene microspheres.

The amount of the base oil added in Step 1 and Step 2 is determined according to the state of mixing, to ensure both the uniform mixing and the fluidity, which is a common knowledge in the art The beneficial effects are as follows. The obtained paper ball-like graphene microspheres have good mechanical properties and elasticity, can effectively absorb impact, and have high stability. In addition, the paper ball-like structure reduces the stacking of graphene and improves the overall stability. When an external force is applied, the graphene microspheres are amenable to rolling friction on a friction surface, and the graphene microspheres can be filled into the worn region under extreme pressure to reduce further abrasive wear, thus significantly improving the wear resistance and friction reduction capability of the grease. Moreover, the graphene microspheres with low specific surface area and low void ratio have better mechanical properties, which is more conducive to improving the lubrication performance.

Solution IV

A barium-based grease comprising paper ball-like graphene microspheres comprises the following components in parts by weight: 70-90 parts of a base oil, 5-20 parts of a barium-based thickener, 0.01-5 parts of paper ball-like graphene microspheres, and 1-5 parts of additional auxiliary agents. The paper ball-like graphene microsphere comprises pleated single-layer graphene sheets with a size of 1-200 μm, and has a diameter of 500 nm-5 μm, a density of 0.04-0.2 g/cm$^3$, and a carbon/oxygen ratio of 10-30.

Further, the additional auxiliary agents include: 0.5-2 parts of an antioxidant, 0-2 parts of a surfactant, and 0.5-1 parts of a rust inhibitor. The barium-based thickener is a reaction product of a $C_{12}$-$C_{24}$ nature fatty acid or synthetic fatty acid with barium hydroxide.

A method for preparing a barium-based grease comprising paper ball-like graphene microspheres comprises the following steps:

(1) mixing paper ball-like graphene microspheres, a base oil, and a $C_{12}$-$C_{24}$ fatty acid, heating to 90-110° C., and then adding barium hydroxide for saponification; and (2) heating the mixture obtained in Step (1) to 150-180° C., dehydrating, then heating to 200-220° C. for refining, cooling to 90-120° C., adding additional auxiliary agents and the remaining base oil, mixing, and grinding, to obtain a barium-based grease comprising paper ball-like graphene microspheres.

The amount of the base oil added in Step 1 and Step 2 is determined according to the state of mixing, to ensure both the uniform mixing and the fluidity, which is a common knowledge in the art.

The present invention has the following beneficial effects. The obtained paper ball-like graphene microspheres have good mechanical properties and elasticity, can effectively absorb impact, and have high stability. In addition, the paper ball-like structure reduces the stacking of graphene and improves the overall stability. When an external force is applied, the graphene microspheres are amenable to rolling friction on a friction surface, and the graphene microspheres can be filled into the worn region under extreme pressure to reduce further abrasive wear, thus significantly improving the wear resistance and friction reduction capability of the grease. Moreover, the graphene microspheres with low specific surface area and low void ratio have better mechanical properties, which is more conducive to improving the lubrication performance.

Solution V

A compounded rubber modified with paper ball-like graphene microspheres comprises the following components in parts by weight: 100 parts of a rubber, 0.1-10 parts of paper ball-like graphene microspheres, 0.5-5 parts of a vulcanizing agent, 3-10 parts of a vulcanization accelerator, 5-20 parts of additional auxiliary agents. The paper ball-like graphene microsphere comprises pleated single-layer graphene sheets, and has a diameter of 500 nm-5 μm, a density of 0.2-0.4 $g/cm^3$, a carbon/oxygen ratio of 20-60, and a specific surface area of less than 200 $m^2/g$.

The rubber is one or more of natural rubber, nitrile rubber, silicone rubber, butadiene rubber, isoprene rubber, styrene butadiene rubber, ethylene propylene rubber, and neoprene rubber. The additional auxiliary agents include: 2-5 parts of stearic acid, 0.5-2 parts of an anti-aging agent, 0.5-3 parts of liquid paraffin, and 2-10 parts of zinc oxide. The vulcanizing agent is at least one of sulfur, a peroxide, a metal oxide, a resin vulcanizing agent, and a sulfur-containing organic compound.

A method for producing a compounded rubber modified with paper ball-like graphene microspheres comprises the following steps:

(1) adding a rubber, paper ball-like graphene microspheres, a vulcanization accelerator, and additional auxiliary agents to an internal mixer, mixing for 10-30 min at a temperature of 40-90° C., and then standing for 5-8 hrs; and (2) mixing the mixture after standing and a vulcanizing agent in an open mill at 40-90° C., and finally vulcanizing on a plate vulcanizer at 150-180° C. for 10 to 40 min.

The present invention has the following beneficial effects. The obtained paper ball-like graphene microspheres have good mechanical properties and elasticity, can effectively absorb impact, and have high stability. In addition, the paper ball-like structure reduces the stacking of graphene and improves the overall stability. The paper ball-like graphene microspheres can effectively improve the mechanical strength of the rubber, absorb the impact and promote the elastic resilience of the material. The addition of graphene also improves the overall thermal conductivity and flame retardancy of the material, resulting in a higher service life of the compounded rubber.

Solution VI

A graphene-based waterborne acrylic coating and a preparation method thereof are provided. The graphene-based waterborne acrylic coating comprises the following components in parts by weight: 100 parts of an acrylic resin emulsion, 0.1-5 parts of paper ball-like graphene microspheres, 30-60 parts of an inorganic filler, 0.9-12 parts of auxiliary agents, and 10-20 parts of water. The paper ball-like graphene microsphere comprises pleated single-layer graphene sheets, and has a diameter of 500 nm-5 μm, a density of 0.2-0.4 $g/cm^3$, a carbon/oxygen ratio of 20-60, and a specific surface area of less than 200 $m^2/g$.

The acrylic resin emulsion is one or more of a pure acrylic emulsion, a styrene-acrylic emulsion, and a vinyl acetate-acrylic emulsion. The inorganic filler is one or more of titania, silica, alumina, calcium carbonate, and potassium carbonate. The auxiliary agents comprise: 0.1-0.5 part of a dispersant, 0.1-0.3 part of a preservative, 0.1-0.5 part of film forming agent, 0.05-0.2 part of a leveling agent, 0.5-10 parts of a thickener, and 0.05-0.5 part of a defoamer.

A method for preparing a graphene-based waterborne acrylic coating comprises: stirring paper ball-like graphene microspheres in an acrylic resin emulsion until uniform, ultrasonically dispersing, adding water, auxiliary agents and an inorganic filler in sequence, stirring at a high speed, and defoaming.

The present invention has the following beneficial effects. The obtained paper ball-like graphene microspheres have good mechanical properties and elasticity, can effectively absorb impact, and have high stability. In addition, the paper ball-like structure reduces the stacking of graphene and improves the overall stability. After being added to the coating, the paper ball-like graphene microsphere has much lower agglomeration than the flake-like graphene and expanded graphite, and can be stably dispersed in the coating for a long time. The coating film obtained after coating and drying has good impact resistance. Due to the corrosion resistance and antibacterial properties of graphene, the related properties of the coating can be further improved.

Solution VII

A graphene/cast nylon composite material comprises 0.1-5 parts of paper ball-like graphene microspheres and 100 parts of cast nylon. The paper ball-like graphene microsphere comprises pleated single-layer graphene sheets, and has a diameter of 500 nm-5 μm, a density of 0.2-0.4 $g/cm^3$, a carbon/oxygen ratio of 20-60, and a specific surface area of less than 200 $m^2/g$.

A method for producing graphene/cast nylon composite material comprises the following steps:

(1) adding 0.1-5 parts of paper ball-like graphene microspheres to 100 parts of molten caprolactam monomer, stirring and heating to 120° C., removing water by distillation under reduced pressure, adding 0.15 part of sodium hydroxide, heating to 140° C., removing water by distillation under reduced pressure for 30 min, and heating to 155° C.; and (2) adding 0.35 part of the cocatalyst tolyl 2, 4-diisocyanate (TDI) to the mixture obtained in Step (1), stirring until uniform, casting into a mold preheated at 165° C., maintaining at this temperature for 30 min, cooling, and releasing from the mold to obtain a graphene/cast nylon composite material.

The beneficial effects of the present invention are as follows. The obtained paper ball-like graphene microsphere has a more compact structure. The compact paper ball-like graphene microspheres have good mechanical properties and elasticity, can effectively absorb impact, and has high stability. When an external force is applied, the graphene microspheres can absorb energy effectively, to reduce the damage to the cast nylon matrix on one hand; and the graphene microspheres are amenable to rolling friction on a friction surface, and the graphene microspheres can be filled into the worn region under extreme pressure to reduce further abrasive wear, thus significantly improving the wear resistance and friction reduction capability of the cast nylon at the other hand.

Solution VIII

A method for improving the impact strength of nylon 6 by using paper ball-like graphene microspheres comprises toughening nylon 6 with paper ball-like graphene microspheres. The paper ball-like graphene microsphere comprises pleated single-layer graphene sheets, and has a diameter of 500 nm-5 μm, a density of 0.2-0.4 g/cm$^3$, a carbon/oxygen ratio of 20-60, and a specific surface area of less than 200 m$^2$/g.

The method comprises specifically the following steps:

(1) pre-mixing nylon 6 with graphene microspheres at a weight ratio of 100:0.05-1 in a mixer, to obtain a uniformly mixed nylon 6/graphene premix, where nylon 6 and the graphene microspheres are dried in a vacuum oven at 80-105° C. for 8-12 hrs before pre-mixing; and (2) melt blending and extruding the premix obtained in Step (1) through a twin-screw extruder at a processing temperature of 230-250° C. and a rotation speed of 150-250 rpm, cooling, and granulating to obtain a nylon 6/graphene composite material.

The beneficial effects are as follows:

1. The paper ball-like graphene microspheres are used as a toughening modifier for nylon 6. The spherical structure of graphene particles can be more easily dispersed in the nylon 6 matrix. The micro-pleated pattern and structure on the surface of the graphene microspheres give flexibility to the graphene particles. Compared with an ordinary flake-like filler, the paper ball-like graphene microspheres can further buffer the stress in a way similar to elastic particles, thereby improving the impact strength of nylon 6.

2. The paper ball-like graphene toughened nylon 6 composite material is processed by melt blending and extrusion. The method has simple operation process, no solvent pollution, high production efficiency and is suitable for large-scale production.

3. By using graphene to modify nylon 6, graphene not only improves the impact strength of nylon 6, but also promotes the crystallization of nylon 6, thereby further improving the rigidity and heat resistance of the material. The comprehensive properties of graphene can also give excellent anti-static performance, ultraviolet aging resistance, flame retardancy and water resistance to the material.

DESCRIPTION OF THE EMBODIMENTS

The present invention will be specifically described by the following examples, which are only used to further illustrate the present invention, and are not to be construed as limiting the scope of the present invention. Some non-essential changes and adjustments made by those skilled in the art according to the disclosure the present invention are contemplated in the scope of protection of the present invention.

Example 1-1

(1) A single-layer graphene oxide dispersion was dried by atomization drying at a temperature of 130° C. to obtain graphene oxide microspheres.

(2) The graphene oxide microspheres obtained in Step (1) were reduced for 1 hr at 60° C. under hydrazine hydrate vapor to obtain reduced graphene oxide microspheres.

(3) The reduced graphene oxide microspheres obtained in Step (2) were transferred to a tubular furnace, and heated to 1000° C. for 1 hr while nitrogen was continuously introduced, to obtain paper ball-like graphene microspheres.

Figure 1:
FIG. 1 is a photo of paper ball-like graphene microspheres produced in Example 1-1 of the present invention.
Figure 2:
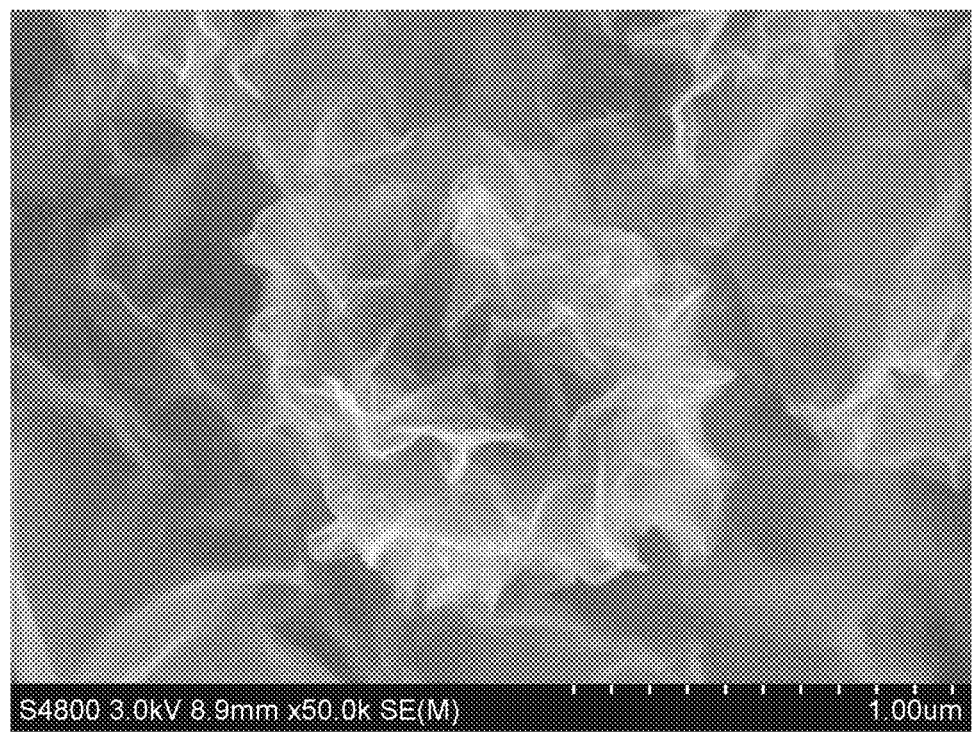
FIG. 2 shows microscopic morphology of the paper ball-like graphene microspheres produced in Example 1-1 of the present invention.

The paper ball-like graphene microsphere obtained through the above steps appears as a black powder as shown in FIG. 1. The paper ball-like graphene microsphere is microscopically a pleated microsphere having a diameter of 3-5 μm, as shown in FIG. 2. The paper ball-like graphene microsphere has a density of 0.2 g/cm$^3$, a carbon/oxygen ratio of 22.7, and a specific surface area of 190 m$^2$/g.

Example 1-2

(1) A single-layer graphene oxide dispersion was dried by atomization drying at a temperature of 130° C. to obtain graphene oxide microspheres.

(2) The graphene oxide microspheres obtained in Step (1) were reduced for 1 hr at 90° C. under hydrazine hydrate vapor to obtain reduced graphene oxide microspheres.

(3) The reduced graphene oxide microspheres obtained in Step (2) were transferred to a tubular furnace, and heated to 1000° C. for 1 hr while nitrogen was continuously introduced, to obtain paper ball-like graphene microspheres.

The paper ball-like graphene microsphere obtained through the above steps appears as a black powder, and is microscopically a pleated microsphere having a diameter of 3-5 μm. The paper ball-like graphene microsphere has a density of 0.23 g/cm$^3$, a carbon/oxygen ratio of 23.1, and a specific surface area of 181 m$^2$/g.

Example 1-3

(1) A single-layer graphene oxide dispersion was dried by atomization drying at a temperature of 130° C. to obtain graphene oxide microspheres.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 1000° C. for 1 hr while nitrogen was continuously introduced, to obtain paper ball-like graphene microspheres.

The paper ball-like graphene microsphere obtained through the above steps appears as a black powder, and is microscopically a pleated microsphere having a diameter of 3-5 μm. The paper ball-like graphene microsphere has a density of 0.25 g/cm$^3$, a carbon/oxygen ratio of 22.9, and a specific surface area of 166 m$^2$/g.

By comparing Examples 1-1 to 1-3, it can be seen that by increasing the reduction temperature and time in Step (2), the specific surface area of the final graphene microspheres can be significantly reduced, and the density is increased, but the carbon/oxygen ratio is not greatly affected. This is because the reduction in Step (2) is mainly to slowly remove the groups on the surface of the graphene oxide. The low reduction temperature or short reduction time may result in insufficient reduction, and the residual groups will continue to be removed during high-temperature thermal treatment in Step (3), during which a gas is generated to cause the graphene sheets to expand outward. The carbon/oxygen ratio is mainly affected by the reduction in Step (3), and has little to do with Step (3). Therefore, in view of the above, the reducing conditions in Step (2) are preferably high reduction temperature and long reduction time.

Example 1-4

(1) A single-layer graphene oxide dispersion containing vitamin C was dried by atomization drying at a temperature of 130° C. to obtain graphene oxide microspheres, where the weight ratio of vitamin C to graphene oxide is 0.1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 1000° C. for 1 hr while nitrogen was continuously introduced, to obtain paper ball-like graphene microspheres.

The paper ball-like graphene microsphere obtained through the above steps appears as a black powder, and is microscopically a pleated microsphere having a diameter of 3-5 μm. The traits are shown in Table 1-1.

Example 1-5

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 1000° C. for 1 hr while nitrogen was continuously introduced, to obtain paper ball-like graphene microspheres.

The paper ball-like graphene microsphere obtained through the above steps appears as a black powder, and is microscopically a pleated microsphere having a diameter of 3-5 μm. The traits are shown in Table 1-1.

Example 1-6

(1) A single-layer graphene oxide dispersion containing vitamin C was dried by atomization drying at a temperature of 130° C. to obtain graphene oxide microspheres, where the weight ratio of vitamin C to graphene oxide is 5.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 1000° C. for 1 hr while nitrogen was continuously introduced, to obtain paper ball-like graphene microspheres.

The paper ball-like graphene microsphere obtained through the above steps appears as a black powder, and is microscopically a pleated microsphere having a diameter of 3-5 μm. The traits are shown in Table 1-1.

Example 1-7

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 2000° C. for 1 hr while nitrogen was continuously introduced, to obtain paper ball-like graphene microspheres.

The paper ball-like graphene microsphere obtained through the above steps appears as a black powder, and is microscopically a pleated microsphere having a diameter of 2-4 μm. The traits are shown in Table 1-1.

Example 1-8

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

The paper ball-like graphene microsphere obtained through the above steps appears as a black powder, and is microscopically a pleated microsphere having a diameter of 500 nm-3 μm. The traits are shown in Table 1-1.

Example 1-9

(1) A single-layer graphene oxide dispersion was dried by atomization drying at a temperature of 130° C. to obtain graphene oxide microspheres.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

The paper ball-like graphene microsphere obtained through the above steps appears as a black powder, and is microscopically a pleated microsphere having a diameter of 1-4 μm. The traits are shown in Table 1-1.

Comparative Example 1-1: Direct thermal reduction without chemical reduction (1) A single-layer graphene oxide dispersion prepared by Hummers method was dried by atomization drying at a temperature of 130° C. to obtain graphene oxide microspheres.

(2) The reduced graphene oxide microspheres obtained in Step (1) were transferred to a tubular furnace, and heated to 2500° C. at a ramping rate of 5° C./min and maintained for 1 hr, while a mixed gas of hydrogen and argon was continuously introduced.

Figure 3:
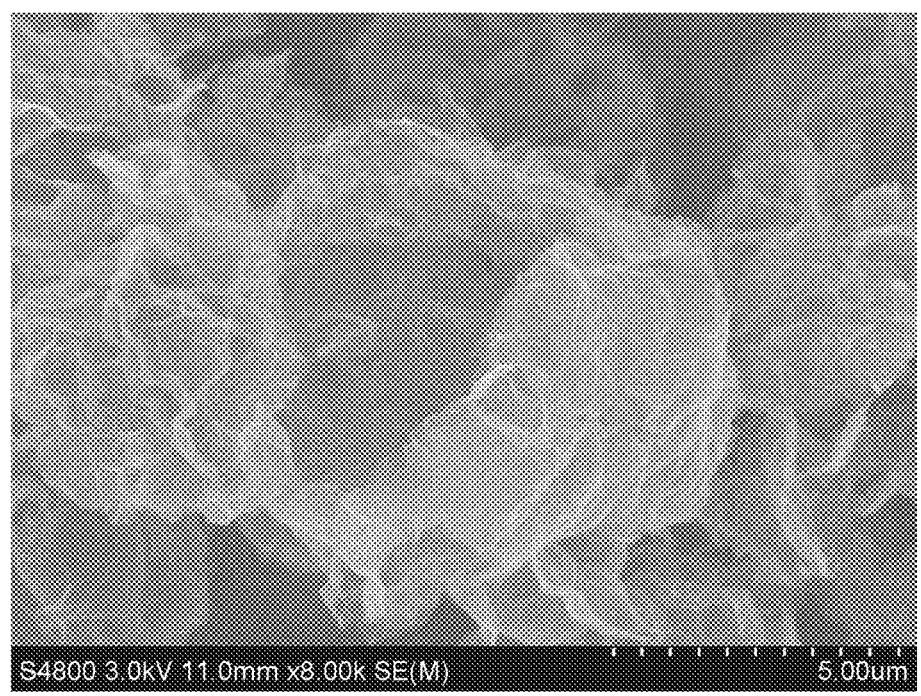
FIG. 3 shows microscopic morphology of expanded graphene microspheres produced in Comparative Example 1-1 of the present invention.

The graphene obtained through the above steps appears as a black loose powder, and is microscopically a hollow sphere having a diameter of 1-10 μm, as shown in FIG. 3. The traits are shown in Table 1-1.

comparing Example 8, it can be seen that the addition of a reducing agent to remove most of the functional groups before thermal treatment can give more compact graphene microspheres.

By comparing Example 1-8 with Comparative Example 1-1, it can be seen that the graphene oxide microspheres are directly subjected to high-temperature thermal treatment in

TABLE 1-1

Physical properties of products obtained in various examples

|  | Weight ratio of reducing | Temperature for high-temperature treatment in step | Before treatment of step | | After treatment of step 3 | | |
|---|---|---|---|---|---|---|---|
|  |  |  | Carbon/ oxygen ratio | Specific surface | Carbon/ oxygen ratio | Specific surface | Density (g/cm³) |
| Example 1-3 | 0 | 1000 | 3.7 | 124 | 22.9 | 166 | 0.25 |
| Example 1-4 | 0.1 | 1000 | 4.6 | 105 | 23.2 | 152 | 0.26 |
| Example 1-5 | 1 | 1000 | 7.1 | 83 | 23.9 | 133 | 0.31 |
| Example 1-6 | 5 | 1000 | 12.4 | 66 | 23.6 | 98 | 0.34 |
| Example 1-7 | 1 | 2000 | 7.1 | 123 | 35.2 | 184 | 0.27 |
| Example 1-8 | 1 | 3000 | 7.1 | 123 | 57.3 | 28 | 0.39 |
| Example 1-9 | 0 | 3000 | 3.7 | 189 | 51.6 | 87 | 0.39 |
| Comparative Example 1-1 | 0 | 3000 | 2 | 230 | 50.4 | 876 | 0.07 |

By comparing Examples 1-3 to 1-6, it can be found that the degree of reduction of the graphene oxide microspheres before the treatment in Step (3) can be effectively improved by increasing the amount of the reducing agent added before the atomization drying, because the reducing agent is uniformly dispersed on the surface of graphene oxide in a molecular form, and gradually reacts with the oxygen-containing functional groups in Steps (1) and (2) to slowly reduce the graphene, so that the carbon/oxygen ratio is increased and the specific surface area is lowered. Through comparison of the situations before and after the reduction in Step (3), it can be seen that the high-temperature thermal treatment removes the unremoved groups in the reduced graphene oxide microspheres (causing the carbon/oxygen ratio to increase), and the generated gas expands the inter-sheet structure of graphene, resulting in an increase in the specific surface area. However, after the reductivity is improved by the addition of the reducing agent, the graphene microspheres release less gas during high-temperature heat treatment in Step (3), which reduces the volume expansion and makes the structure more compact. Therefore, in order to obtain graphene microspheres with a high density and a low specific surface area, it is important to add a reducing agent.

By comparing Examples 1-5 and 1-7, it can be found that while reducing conditions in the first two steps are identical, the increase of the reduction temperature in Step (3) increases the specific surface area and decreases the density, because the further release of the gas causes the sheet structure to be further expanded. However, unexpectedly, when the temperature rises to 3000° C. (Example 1-8), the specific surface area is greatly reduced, possibly because after the temperature is higher than the graphitization temperature, the large π-conjugated structure of graphene is repaired, the bonding force between the sheets is greatly improved, and the distance between the sheets is lowered, so that the graphene microspheres are "concentrated" toward the center and thus become more compact.

Figure 4:
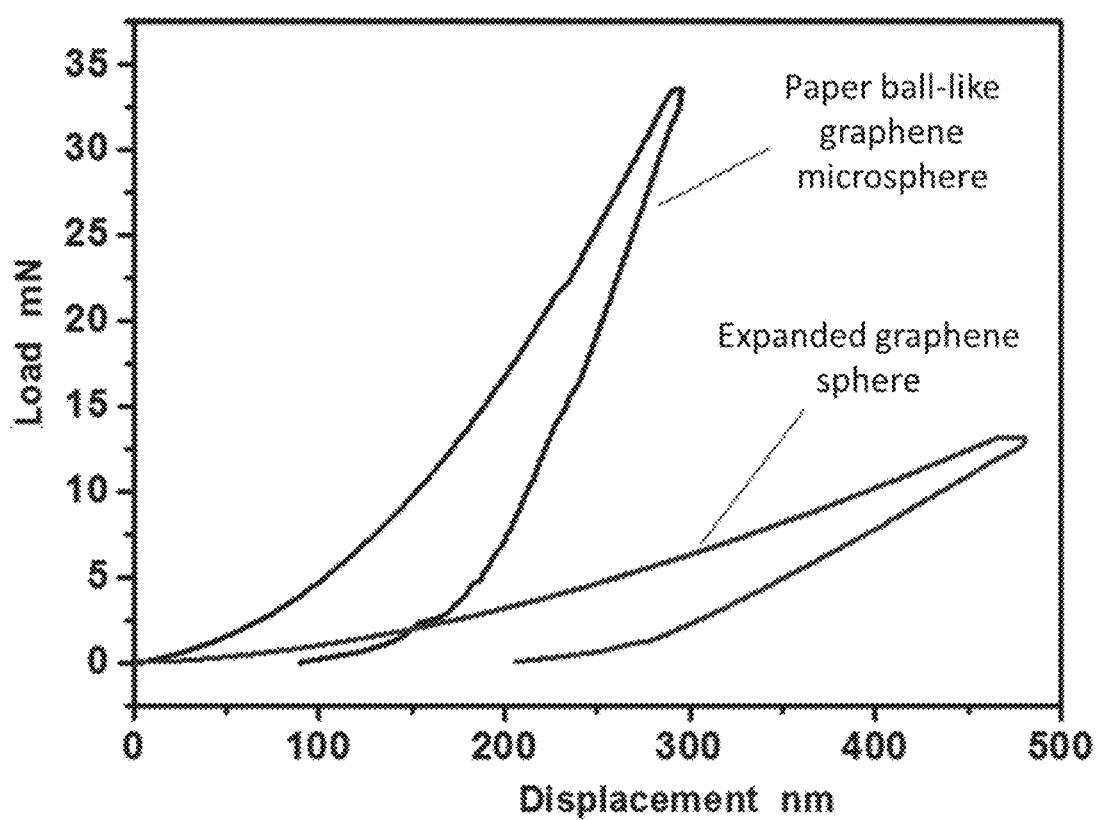
FIG. 4 shows nanoindentation load-displacement curves of graphene microspheres produced in Example 1-8 and Comparative Example 1-1 of the present invention.

By comparing Examples 1-3 and 1-9, it can be seen that the specific surface area of the graphene microspheres can be significantly reduced by thermal treatment at 3000° C. without the addition of a reducing agent. However, by the comparative example, and a large amount of gas is released during the reduction to give rise to rapid volume expansion, high specific surface area, and low density. From the nanoindentation load-displacement curves, it is found that the maximum compressive stress, modulus and elastic resilience of the paper ball-like graphene microsphere are significantly higher than those of the expanded graphene sphere, as shown in FIG. 4.

Example 1-10

In this example, the microspheres obtained in Examples 1-3, 1-5, and 1-8 and Comparative Example 1-1 were compounded with rubber. After the mechanical property test, the performances are shown in Table 1-2. It can be found that the use of paper ball-like graphene microspheres having a high density and a low specific surface area can significantly increase the tensile strength and tear strength of the rubber.

TABLE 1-2

Tensile properties of rubber compounded with various examples

|  | Tensile strength (MPa) | Tearing strength (kN m¹) |
|---|---|---|
| Example 1-3 | 23.8 | 25.6 |
| Example 1-5 | 26.9 | 28.7 |
| Example 1-8 | 28.4 | 31.2 |
| Comparative Example 1-1 | 20.1 | 19.7 |

Example 2-1

Steps 1-3 are the same as those in Example 1-1.

Step 4: 0.1 part of the paper ball-like graphene microspheres obtained in Step (3), 0.5 part of a dispersing agent, 0.6 part of a compatilizer, 0.5 part of a viscosity modifier, 0.3 part of an antifoaming agent, and 1 part of a preservative were sequentially added to 100 parts a base oil, and stirred until uniform.

Step 5: The mixture obtained in Step (4) was ultrasonically dispersed and defoamed.

Figure 5:
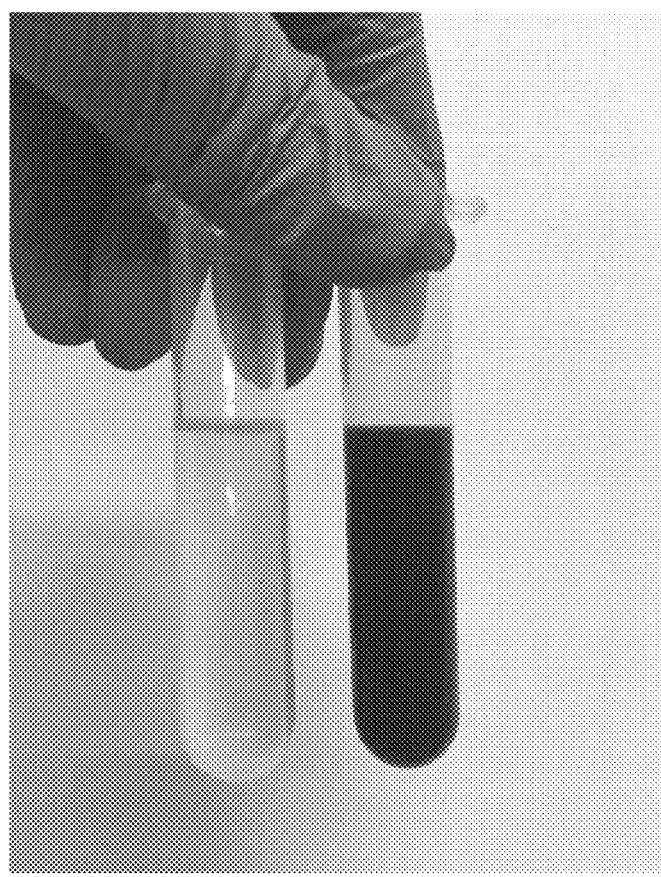
FIG. 5 shows a microscopic photo of a graphene-based lubricating oil produced in Example 2-1 of the present invention.

A graphene-based lubricating oil is obtained through the above steps, which is a black viscous liquid as shown in FIG. 5. The obtained lubricating oil has a friction coefficient of 0.094.

Example 2-2

Steps 1-3 are the same as those in Example 1-2.
Step 4: 0.1 part of the paper ball-like graphene microspheres obtained in Step (3), 0.5 part of a dispersing agent, 0.6 part of a compatilizer, 0.5 part of a viscosity modifier, 0.3 part of an antifoaming agent, and 1 part of a preservative were sequentially added to 100 parts of a base oil, and stirred until uniform.
Step 5: The mixture obtained in Step (4) was ultrasonically dispersed and defoamed.
A graphene-based lubricating oil is obtained through the above steps, which has a friction coefficient of 0.092.

Example 2-3

Steps 1-3 are the same as those in Example 1-3.
Step 4: 0.1 part of the paper ball-like graphene microspheres obtained in Step (3), 0.5 part of a dispersing agent, 0.6 part of a compatilizer, 0.5 part of a viscosity modifier, 0.3 part of an antifoaming agent, and 1 part of a preservative were sequentially added to 100 parts of a base oil, and stirred until uniform.
Step 5: The mixture obtained in Step (4) was ultrasonically dispersed and defoamed.
A graphene-based lubricating oil is obtained through the above steps, which has a friction coefficient of 0.089.
The specific surface area of the paper ball-like graphene microspheres has a great influence on the anti-friction performance of the composite lubricating oil. The friction coefficient of Example 2-3 is the lowest. Therefore, in view of the above, the reducing conditions in Step (2) are preferably high reduction temperature and long reduction time.

Example 2-4

Steps 1-3 are the same as those in Example 1-4.
Step 4: 0.1 part of the paper ball-like graphene microspheres obtained in Step (3), 0.5 part of a dispersing agent, 0.6 part of a compatilizer, 0.5 part of a viscosity modifier, 0.3 part of an antifoaming agent, and 1 part of a preservative were sequentially added to 100 parts of a base oil, and stirred until uniform.
Step 5: The mixture obtained in Step (4) was ultrasonically dispersed and defoamed.
A graphene-based lubricating oil is obtained through the above steps. Specific properties are shown in Table 2.

Example 2-5

Steps 1-3 are the same as those in Example 1-5.
Step 4: 0.1 part of the paper ball-like graphene microspheres obtained in Step (3), 1 part of a dispersing agent, 0.6 part of a compatilizer, 0.3 part of a viscosity modifier, 0.3 part of an antifoaming agent, and 1 part of a preservative were sequentially added to 100 parts of a base oil, and stirred until uniform.
Step 5: The mixture obtained in Step (4) was ultrasonically dispersed and defoamed.
A graphene-based lubricating oil is obtained through the above steps. Specific properties are shown in Table 2.

Example 2-6

Steps 1-3 are the same as those in Example 1-6.
Step 4: 0.1 part of the paper ball-like graphene microspheres obtained in Step (3), 0.5 part of a dispersing agent, 1 part of a compatilizer, 0.5 part of a viscosity modifier, 0.5 part of an antifoaming agent, and 5 part of a preservative were sequentially added to 100 parts of a base oil, and stirred until uniform.
Step 5: The mixture obtained in Step (4) was ultrasonically dispersed and defoamed.
A graphene-based lubricating oil is obtained through the above steps. Specific properties are shown in Table 2.

Example 2-7

Steps 1-3 are the same as those in Example 1-7.
Step 4: 0.1 part of the paper ball-like graphene microspheres obtained in Step (3), 1 part of a dispersing agent, 1.5 parts of a compatilizer, 0.5 part of a viscosity modifier, 0.3 part of an antifoaming agent, and 5 parts of a preservative were sequentially added to 100 parts of a base oil, and stirred until uniform.
Step 5: The mixture obtained in Step (4) was ultrasonically dispersed and defoamed.
A graphene-based lubricating oil is obtained through the above steps. Specific properties are shown in Table 2.

Example 2-8

Steps 1-3 are the same as those in Example 1-8.
Step 4: 0.1 part of the paper ball-like graphene microspheres obtained in Step (3), 0.8 part of a dispersing agent, 0.6 part of a compatilizer, 1 part of a viscosity modifier, 0.5 part of an antifoaming agent, and 5 part of a preservative were sequentially added to 100 parts of a base oil, and stirred until uniform.
Step 5: The mixture obtained in Step (4) was ultrasonically dispersed and defoamed.
A graphene-based lubricating oil is obtained through the above steps. Specific properties are shown in Table 2.

Example 2-9

Steps 1-3 are the same as those in Example 1-9.
Step 4: 0.1 part of the paper ball-like graphene microspheres obtained in Step (3), 1 part of a dispersing agent, 0.7 part of a compatilizer, 0.5 part of a viscosity modifier, 0.3 part of an antifoaming agent, and 10 part of a preservative were sequentially added to 100 parts of a base oil, and stirred until uniform.
Step 5: The mixture obtained in Step (4) was ultrasonically dispersed and defoamed.
A graphene-based lubricating oil is obtained through the above steps. Specific properties are shown in Table 2.

Comparative Example 2-1: Lubricating oil without graphene

Comparative Example 2-2: Direct thermal reduction without chemical reduction (1) A single-layer graphene oxide dispersion was dried by atomization drying at a temperature of 130° C. to obtain graphene oxide microspheres.
(2) The graphene oxide microspheres obtained in Step (1) were transferred to a tubular furnace, and heated to 3000° C. at a ramping rate of 5° C./min and maintained for 1 hr, while a mixed gas of hydrogen and argon was continuously introduced.
(3) 0.1 part of the graphene obtained in Step (2), 0.5 part of a dispersing agent, 0.6 part of a compatilizer, 0.5 part of a viscosity modifier, 0.3 part of an antifoaming agent, and 1 part of a preservative were sequentially added to 100 parts of a base oil, and stirred until uniform.

(4) The mixture obtained in Step (3) was ultrasonically dispersed and defoamed.

The graphene obtained through the above steps appears as a black loose powder, and is microscopically a hollow sphere having a diameter of 1-10 μm. Specific properties of the resulting lubricating oil are shown in Table 2.

Example 2-11

(1) A single-layer graphene oxide dispersion containing vitamin C was dried by atomization drying at a temperature of 130° C. to obtain graphene oxide microspheres, where the weight ratio of vitamin C to graphene oxide is 1.

TABLE 2

Specific parameters and properties of the example

| | Weight ratio of reducing agent to graphene | Temperature for high-temperature treatment in Step (3) | Before treatment of step Carbon/oxygen ratio | After treatment of step 3 | | | |
|---|---|---|---|---|---|---|---|
| | | | | Specific surface area ($m^2/g$) | Carbon/oxygen ratio | Specific surface area ($m^2/g$) | Density ($g/cm^3$) | Friction coefficient |
| Example 2-3 | 0 | 1000 | 3.7 | 124 | 23 | 166 | 0.25 | 0.089 |
| Example 2-4 | 0.1 | 1000 | 4.6 | 105 | 23.2 | 152 | 0.26 | 0.086 |
| Example 2-5 | 1 | 1000 | 7.1 | 83 | 23.9 | 133 | 0.31 | 0.085 |
| Example 2-6 | 5 | 1000 | 12.4 | 66 | 23.6 | 98 | 0.34 | 0.081 |
| Example 2-7 | 1 | 2000 | 7.1 | 123 | 35.2 | 184 | 0.27 | 0.079 |
| Example 2-8 | 1 | 3000 | 7.1 | 123 | 52.3 | 28 | 0.39 | 0.071 |
| Example 2-9 | 0 | 3000 | 3.7 | 189 | 51.6 | 87 | 0.39 | 0.073 |
| Comparative Example 2-1 | — | — | — | — | — | — | — | 0.13 |
| Comparative Example 2-2 | 0 | 3000 | 2.3 | 230 | 50.4 | 876 | 0.07 | 0.112 |

When combined with a lubricating oil, the more compact spheres have better wear resistance and can provide more effective protection between the friction surfaces, thus reducing the friction and abrasive wear. In contrast, graphene microspheres with a large specific surface area and a large void ratio are prone to deformation under pressure, and the friction reducing ability declines.

Example 2-10

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

(4) 0.05 part of the paper ball-like graphene microspheres obtained in Step (3), 0.8 part of a dispersing agent, 0.6 part of a compatilizer, 1 part of a viscosity modifier, 0.5 part of an antifoaming agent, and 5 parts of a preservative were sequentially added to 100 parts of a base oil, and stirred until uniform.

(5) The mixture obtained in Step (4) was ultrasonically dispersed and defoamed.

Through the above steps, a graphene-based lubricating oil is obtained, where the paper ball-like graphene microsphere is microscopically a pleated microsphere having a diameter of 500 nm to 3 μm. Since Steps (1)-(3) are the same as those in Example 2-8, the graphene microsphere has the same carbon/oxygen ratio, density, and specific surface area as in Example 2-8, and has a friction coefficient of 0.75.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

(4) 1 part of the paper ball-like graphene microspheres obtained in Step (3), 0.8 part of a dispersing agent, 0.6 part of a compatilizer, 1 part of a viscosity modifier, 0.5 part of an antifoaming agent, and 5 parts of a preservative were sequentially added to 100 parts of a base oil, and stirred until uniform.

(5) The mixture obtained in Step (4) was ultrasonically dispersed and defoamed.

Through the above steps, a graphene-based lubricating oil is obtained, where the paper ball-like graphene microsphere is microscopically a pleated microsphere having a diameter of 500 nm to 3 μm. Since Steps (1)-(3) are the same as those in Example 2-8, the graphene microsphere has the same carbon/oxygen ratio, density, and specific surface area as in Example 2-8, and has a friction coefficient of 0.67.

By comparing Examples 2-8, 2-10, and 2-11, it can be seen that the friction coefficient of the composite lubricating oil decreases with increasing amount of the paper ball-like graphene microspheres added, indicating the good lubricity of the graphene microspheres.

Example 3-1

Steps 1-3 are the same as those in Example 1-1.

Step 4: 0.1 part of the paper ball-like graphene microspheres obtained in Step (3), 51 parts of a base oil, 8.1 parts of 12-hydroxystearic acid and 3.8 parts of benzoic acid were mixed, and heated to 70° C. Lithium hydroxide was added for saponification.

Step 5: The mixture obtained in Step (4) was heated to 160° C., dehydrated, and further heated to 190° C. for refining. After cooling, 0.6 part of an antioxidant, 1.4 parts of a rust inhibitor and 35 parts of a base oil were added, mixed and ground to obtain a lithium complex-based grease comprising paper ball-like graphene microspheres.

Through the above steps, a lithium complex-based grease comprising paper ball-like graphene microspheres is obtained. The performances of the resulting grease are shown in Table 3.

Example 3-2

Steps 1-3 are the same as those in Example 1-2.

Step 4: 0.1 part of the paper ball-like graphene microspheres obtained in Step (3), 51 parts of a base oil, 8.1 parts of 12-hydroxystearic acid and 3.8 parts of benzoic acid were mixed, and heated to 70° C. Lithium hydroxide was added for saponification.

Step 5: The mixture obtained in Step (4) was heated to 160° C., dehydrated, and further heated to 190° C. for refining. After cooling, 0.6 part of an antioxidant, 1.4 parts of a rust inhibitor and 35 parts of a base oil were added, mixed and ground to obtain a lithium complex-based grease comprising paper ball-like graphene microspheres.

Through the above steps, a lithium complex-based grease comprising paper ball-like graphene microspheres is obtained. The performances of the resulting lithium complex-based grease are shown in Table 3.

Example 3-3

Steps 1-3 are the same as those in Example 1-3.

Step 4: 0.1 part of the paper ball-like graphene microspheres obtained in Step (3), 51 parts of a base oil, 8.1 parts of 12-hydroxystearic acid and 3.8 parts of benzoic acid were mixed, and heated to 70° C. Lithium hydroxide was added for saponification.

Step 5: The mixture obtained in Step (4) was heated to 160° C., dehydrated, and further heated to 190° C. for refining. After cooling, 0.6 part of an antioxidant, 1.4 parts of a rust inhibitor and 35 parts of a base oil were added, mixed and ground to obtain a lithium complex-based grease comprising paper ball-like graphene microspheres.

Through the above steps, a lithium complex-based grease comprising paper ball-like graphene microspheres is obtained. The performances of the resulting lithium complex-based grease are shown in Table 3.

A lower specific surface area and a higher density of the paper ball-like graphene microsphere means a more compact structure, and a better pressure resistance and elasticity, whereby the overall performance of the composite lubricating oil are much better, as shown in Table 3. Therefore, in view of the above, the reducing conditions in Step (2) are preferably high reduction temperature and long reduction time.

Example 3-4

Steps 1-3 are the same as those in Example 1-4.

Step 4: 0.1 part of the paper ball-like graphene microspheres obtained in Step (3), 47 parts of a base oil, 7.4 parts of 12-hydroxystearic acid and 4.5 parts of benzoic acid were mixed, and heated to 90° C. Lithium hydroxide was added for saponification.

Step 5: The mixture obtained in Step (4) was heated to 170° C., dehydrated, and further heated to 200° C. for refining. After cooling, 0.5 part of an antioxidant, 1.5 parts of a rust inhibitor and 39 parts of a base oil were added, mixed and ground to obtain a lithium complex-based grease comprising paper ball-like graphene microspheres.

A lithium complex-based grease comprising paper ball-like graphene microspheres is obtained through the above steps. Specific properties are shown in Table 3.

Example 3-5

Steps 1-3 are the same as those in Example 1-5.

Step 4: 0.1 part of the paper ball-like graphene microspheres obtained in Step (3), 63 parts of a base oil, 5.3 parts of 12-hydroxystearic acid and 6.6 parts of benzoic acid were mixed, and heated to 80° C. Lithium hydroxide was added for saponification.

Step 5: The mixture obtained in Step (4) was heated to 165° C., dehydrated, and further heated to 200° C. for refining. After cooling, 0.5 part of an antioxidant, 1.5 parts of a rust inhibitor and 23 parts of a base oil were added, mixed and ground to obtain a lithium complex-based grease comprising paper ball-like graphene microspheres.

A lithium complex-based grease comprising paper ball-like graphene microspheres is obtained through the above steps. Specific properties are shown in Table 3.

Example 3-6

Steps 1-3 are the same as those in Example 1-6.

Step 4: 0.1 part of the paper ball-like graphene microspheres obtained in Step (3), 63 parts of a base oil, 5.6 parts of 12-hydroxystearic acid and 5.3 parts of benzoic acid were mixed, and heated to 90° C. Lithium hydroxide was added for saponification.

Step 5: The mixture obtained in Step (4) was heated to 180° C., dehydrated, and further heated to 220° C. for refining. After cooling, 0.6 part of an antioxidant, 1.4 parts of a rust inhibitor and 24 parts of a base oil were added, mixed and ground to obtain a lithium complex-based grease comprising paper ball-like graphene microspheres.

A lithium complex-based grease comprising paper ball-like graphene microspheres is obtained through the above steps. Specific properties are shown in Table 3.

Example 3-7

Steps 1-3 are the same as those in Example 1-7.

Step 4: 0.1 part of the paper ball-like graphene microspheres obtained in Step (3), 63 parts of a base oil, 5.6 parts of 12-hydroxystearic acid and 5.3 parts of benzoic acid were mixed, and heated to 90° C. Lithium hydroxide was added for saponification.

Step 5: The mixture obtained in Step (4) was heated to 180° C., dehydrated, and further heated to 220° C. for refining. After cooling, 0.6 part of an antioxidant, 1.4 parts of a rust inhibitor and 24 parts of a base oil were added, mixed and ground to obtain a lithium complex-based grease comprising paper ball-like graphene microspheres.

A lithium complex-based grease comprising paper ball-like graphene microspheres is obtained through the above steps. Specific properties are shown in Table 3.

Example 3-8

Steps 1-3 are the same as those in Example 1-8.

Step 4: 0.1 part of the paper ball-like graphene microspheres obtained in Step (3), 63 parts of a base oil, 5.9 parts of 12-hydroxystearic acid and 5 parts of p-methylbenzoic acid were mixed, and heated to 90° C. Lithium hydroxide was added for saponification.

Step 5: The mixture obtained in Step (4) was heated to 170° C., dehydrated, and further heated to 220° C. for refining. After cooling, 0.6 part of an antioxidant, 1.4 parts of a rust inhibitor and 24 parts of a base oil were added, mixed and ground to obtain a lithium complex-based grease comprising paper ball-like graphene microspheres.

A lithium complex-based grease comprising paper ball-like graphene microspheres is obtained through the above steps. Specific properties are shown in Table 3.

Example 3-9

Steps 1-3 are the same as those in Example 1-9.

Step 4: 0.1 part of the paper ball-like graphene microspheres obtained in Step (3), 61 parts of a base oil, 5.9 parts of 12-hydroxystearic acid and 4 parts of p-methylbenzoic acid were mixed, and heated to 90° C. Lithium hydroxide was added for saponification.

Step 5: The mixture obtained in Step (4) was heated to 170° C., dehydrated, and further heated to 220° C. for refining. After cooling, 0.6 part of an antioxidant, 1.4 parts of a rust inhibitor and 27 parts of a base oil were added, mixed and ground to obtain a lithium complex-based grease comprising paper ball-like graphene microspheres.

A lithium complex-based grease comprising paper ball-like graphene microspheres is obtained through the above steps. Specific properties are shown in Table 3.

Comparative Example 3-1: The lithium complex-based grease was prepared following the method as described in Example 3-1 except that no paper ball-like graphene microspheres were added during the preparation. The performances are shown in Table 3.

Comparative Example 3-2: Direct thermal reduction of graphene oxide microspheres without chemical reduction (1) A single-layer graphene oxide dispersion was dried by atomization drying at a temperature of 130° C. to obtain graphene oxide microspheres.

(2) The graphene oxide microspheres obtained in Step) were transferred to a tubular furnace, and heated to 3000° C. for 1 hr, while a mixed gas of hydrogen and argon was continuously introduced.

(3) 0.1 part of the graphene obtained in Step (2), 61 parts of a base oil, 5.9 parts of 12-hydroxystearic acid and 4 parts of p-methylbenzoic acid were mixed, and heated to 90° C. Lithium hydroxide was added for saponification.

(4) The mixture obtained in Step (3) was heated to 170° C., dehydrated, and further heated to 220° C. for refining. After cooling, 0.6 part of an antioxidant, 1.4 parts of a rust inhibitor and 27 parts of a base oil were added, mixed and ground to obtain a lithium complex-based grease.

The graphene obtained through the above steps appears as a black loose powder, and is microscopically a hollow sphere having a diameter of 1-10 μm. The performances of the resulting lithium complex-based grease are shown in Table 3.

TABLE 3

| | Wear resistance | | | |
|---|---|---|---|---|
| | Dropping point (° C.) | Worked cone penetration (0.1 mm) | Copper strip corrosion at 24 hr | PB value from four-ball method (kg) | Oil separation by copper mesh at 100° C. for 24 hrs (%) |
| Example 3-1 | 209 | 277 | Acceptance | 87 | 2.96 |
| Example 3-2 | 213 | 275 | Acceptance | 89 | 2.91 |
| Example 3-3 | 215 | 272 | Acceptance | 91 | 2.84 |
| Example 3-4 | 219 | 269 | Acceptance | 95 | 2.72 |
| Example 3-5 | 223 | 264 | Acceptance | 97 | 2.59 |
| Example 3-6 | 228 | 261 | Acceptance | 102 | 2.51 |
| Example 3-7 | 233 | 256 | Acceptance | 105 | 2.4 |
| Example 3-8 | 241 | 252 | Acceptance | 112 | 2.22 |
| Example 3-9 | 238 | 254 | Acceptance | 103 | 2.31 |
| Example 3-10 | 245 | 246 | Acceptance | 124 | 2.1 |
| Comparative Example 3-1 | 186 | 292 | Acceptance | 78 | 3.12 |
| Comparative Example 3-2 | 204 | 282 | Acceptance | 84 | 3.01 |

The density, size and specific surface area of the graphene microspheres have a great influence on the properties of the final composite grease. If the voids increase, the compressive strength, modulus, and elastic resilience of the microspheres decrease, and the effect of lubricating when acting on a friction surface is also reduced. Moreover, the dispersion is easier to become stable as the particle size decreases. Therefore, in view of the above, more compact graphene microspheres are needed. In the present invention, the densification of the graphene microspheres are achieved by controlling the reducing parameters in each step, thereby effectively improving the comprehensive performances of the grease.

Example 3-10

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

(4) 5 parts of the paper ball-like graphene microspheres obtained in Step (3), 63 parts of a base oil, 5.6 parts of 12-hydroxystearic acid and 5.3 parts of benzoic acid were mixed, and heated to 90° C. Lithium hydroxide was added for saponification.

(5) The mixture obtained in Step (4) was heated to 180° C., dehydrated, and further heated to 220° C. for refining. After cooling, 0.6 part of an antioxidant, 1.4 parts of a rust inhibitor and 24 parts of a base oil were added, mixed and ground to obtain a lithium complex-based grease comprising paper ball-like graphene microspheres.

Through the above steps, a lithium complex-based grease comprising paper ball-like graphene microspheres is obtained, where the paper ball-like graphene microsphere is microscopically a pleated microsphere having a diameter of 500 nm to 3 μm. Since Steps (1)-(3) are the same as those in Example 3-8, the graphene microsphere has the same carbon/oxygen ratio, density, and specific surface area as in Example 3-8. Specific properties are shown in Table 3. It can be found that increasing the amount of graphene microspheres added can further enhance various performance of the grease.

Example 4-1

Steps 1-3 are the same as those in Example 1-1.
Step 4: 0.1 part of the paper ball-like graphene microspheres obtained in Step (3), 54 parts of a base oil, and 8.9 parts of stearic acid were mixed, and heated to 90° C. Barium hydroxide was added for saponification.
Step 5: The mixture obtained in Step (4) was heated to 160° C., dehydrated, and further heated to 210° C. for refining. After cooling to 100° C., 0.6 part of an antioxidant, 1.4 parts of a rust inhibitor and 35 parts of a base oil were added, mixed and ground to obtain a barium-based grease comprising paper ball-like graphene microspheres.
Through the above steps, a barium-based grease comprising paper ball-like graphene microspheres is obtained. The performances of the resulting grease are shown in Table 4.

Example 4-2

Steps 1-3 are the same as those in Example 1-2.
Step 4: 0.1 part of the paper ball-like graphene microspheres obtained in Step (3), 54 parts of a base oil, and 8.9 parts of stearic acid were mixed, and heated to 90° C. Barium hydroxide was added for saponification.
Step 5: The mixture obtained in Step (4) was heated to 160° C., dehydrated, and further heated to 210° C. for refining. After cooling to 100° C. 0.6 part of an antioxidant, 1.4 parts of a rust inhibitor and 35 parts of a base oil were added, mixed and ground to obtain a barium-based grease comprising paper ball-like graphene microspheres.
Through the above steps, a barium-based grease comprising paper ball-like graphene microspheres is obtained. The performances of the resulting grease are shown in Table 4.

Example 4-3

Steps 1-3 are the same as those in Example 1-3.
Step 4: 0.1 part of the paper ball-like graphene microspheres obtained in Step (3), 54 parts of a base oil, and 8.9 parts of stearic acid were mixed, and heated to 90° C. Barium hydroxide was added for saponification.
Step 5: The mixture obtained in Step (4) was heated to 160° C., dehydrated, and further heated to 210° C. for refining. After cooling to 100° C., 0.6 part of an antioxidant, 1.4 parts of a rust inhibitor and 35 parts of a base oil were added, mixed and ground to obtain a barium-based grease comprising paper ball-like graphene microspheres.
Through the above steps, a barium-based grease comprising paper ball-like graphene microspheres is obtained. The performances of the resulting grease are shown in Table 4.
A lower specific surface area and a higher density of the paper ball-like graphene microsphere means a more compact structure, and a better pressure resistance and elasticity, whereby the overall performance of the composite lubricating oil are much better, as shown in Table 4. Therefore, in view of the above, the reducing conditions in Step (2) are preferably high reduction temperature and long reduction time.

Example 4-4

Steps 1-3 are the same as those in Example 1-4.

Step 4: 0.1 part of the paper ball-like graphene microspheres obtained in Step (3), 51 parts of a base oil, and 9.8 parts of 12-hydroxystearic acid were mixed, and heated to 100° C. Barium hydroxide was added for saponification.
Step 5: The mixture obtained in Step (4) was heated to 150° C., dehydrated, and further heated to 200° C. for refining. After cooling to 120° C., 0.6 part of an antioxidant, 1.4 parts of a rust inhibitor, 1 part of a surfactant, and 36 parts of a base oil were added, mixed and ground to obtain a barium-based grease comprising paper ball-like graphene microspheres.
Through the above steps, a barium-based grease comprising paper ball-like graphene microspheres is obtained. Specific properties are shown in Table 4.

Example 4-5

Steps 1-3 are the same as those in Example 1-5.
Step 4: 0.1 part of the paper ball-like graphene microspheres obtained in Step (3), 52 parts of a base oil, and 8.9 parts of stearic acid were mixed, and heated to 105° C. Barium hydroxide was added for saponification.
Step 5: The mixture obtained in Step (4) was heated to 155° C., dehydrated, and further heated to 215° C. for refining. After cooling to 120° C., 0.6 part of an antioxidant, 1.4 parts of a rust inhibitor and 37 parts of a base oil were added, mixed and ground to obtain a barium-based grease comprising paper ball-like graphene microspheres.
Through the above steps, a barium-based grease comprising paper ball-like graphene microspheres is obtained. Specific properties are shown in Table 4.

Example 4-6

Steps 1-3 are the same as those in Example 1-6.
Step 4: 0.3 part of the paper ball-like graphene microspheres obtained in Step (3), 51 parts of a base oil, and 11.6 parts of 12-hydroxystearic acid were mixed, and heated to 100° C. Barium hydroxide was added for saponification.
Step 5: The mixture obtained in Step (4) was heated to 150° C., dehydrated, and further heated to 200° C. for refining. After cooling to 120° C., 0.6 part of an antioxidant, 1.4 parts of a rust inhibitor, 1 part of a surfactant, and 28 parts of a base oil were added, mixed and ground to obtain a barium-based grease comprising paper ball-like graphene microspheres.
Through the above steps, a barium-based grease comprising paper ball-like graphene microspheres is obtained. Specific properties are shown in Table 4.

Example 4-7

Steps 1-3 are the same as those in Example 1-7.
Step 4: 0.05 part of the paper ball-like graphene microspheres obtained in Step (3), 48 parts of a base oil, and 13.1 parts of stearic acid were mixed, and heated to 100° C. Barium hydroxide was added for saponification.
Step 5: The mixture obtained in Step (4) was heated to 150° C., dehydrated, and further heated to 200° C. for refining. After cooling to 120° C., 0.6 part of an antioxidant, 1.4 parts of a rust inhibitor, 1 part of a surfactant, and 28 parts of a base oil were added, mixed and ground to obtain a barium-based grease comprising paper ball-like graphene microspheres.
Through the above steps, a barium-based grease comprising paper ball-like graphene microspheres is obtained. Specific properties are shown in Table 4.

Example 4-8

Steps 1-3 are the same as those in Example 1-8.

Step 4: 0.2 part of the paper ball-like graphene microspheres obtained in Step (3), 58 parts of a base oil, and 17.8 parts of stearic acid were mixed, and heated to 100° C. Barium hydroxide was added for saponification.

Step 5: The mixture obtained in Step (4) was heated to 155° C., dehydrated, and further heated to 200° C. for refining. After cooling to 120° C., 0.6 part of an antioxidant, 1.4 parts of a rust inhibitor, 1 part of a surfactant, and 31 parts of a base oil were added, mixed and ground to obtain a barium-based grease comprising paper ball-like graphene microspheres.

Through the above steps, a barium-based grease comprising paper ball-like graphene microspheres is obtained. Specific properties are shown in Table 4.

Example 4-9

Steps 1-3 are the same as those in Example 1-9.

Step 4: 0.1 part of the paper ball-like graphene microspheres obtained in Step (3), 41 parts of a base oil, and 9.4 parts of stearic acid were mixed, and heated to 100° C. Barium hydroxide was added for saponification.

Step 5: The mixture obtained in Step (4) was heated to 155° C., dehydrated, and further heated to 210° C. for refining. After cooling to 110° C., 0.6 part of an antioxidant, 1.4 parts of a rust inhibitor, 1 part of a surfactant, and 35 parts of a base oil were added, mixed and ground to obtain a barium-based grease comprising paper ball-like graphene microspheres.

Through the above steps, a barium-based grease comprising paper ball-like graphene microspheres is obtained. Specific properties are shown in Table 4.

Comparative Example 4-1: A barium-based grease was prepared following the method as described in Example 4-1, except that no paper ball-like graphene microspheres were added during preparation. The performances are shown in Table 4.

Comparative Example 4-2: Direct thermal reduction of graphene oxide microspheres without chemical reduction (1) A single-layer graphene oxide dispersion was dried by atomization drying at a temperature of 130° C. to obtain graphene oxide microspheres.

(2) The graphene oxide microspheres obtained in Step (1) were transferred to a tubular furnace, and heated to 3000° C. for 1 hr, while a mixed gas of hydrogen and argon was continuously introduced.

(3) 0.1 part of the graphene obtained in Step (2), 51 parts of a base oil, and 8.9 parts of 12-hydroxystearic acid were mixed, and heated to 100° C. Barium hydroxide was added for saponification.

(4) The mixture obtained in Step (3) was heated to 160° C., dehydrated, and further heated to 210° C. for refining. After cooling, 0.6 part of an antioxidant, 1.4 parts of a rust inhibitor and 38 parts of a base oil were added, mixed and ground to obtain a barium-based grease.

The graphene obtained through the above steps appears as a black loose powder, and is microscopically a hollow sphere having a diameter of 1-10 μm. The performances of the resulting barium-based grease are shown in Table 4.

TABLE 4

| | Friction performances | | | | |
|---|---|---|---|---|---|
| | Dropping point (° C.) | Worked cone penetration (0.1 mm) | Copper strip corrosion at 24 hr | Friction Coefficient | Oil separation by copper mesh at 100° C. for 24 hrs (%) |
| Example 4-1 | 254 | 272 | Acceptance | 0.56 | 3.38 |
| Example 4-2 | 255 | 768 | Acceptance | 0.53 | 3.31 |
| Example 4-3 | 258 | 266 | Acceptance | 0.52 | 3.32 |
| Example 4-4 | 259 | 264 | Acceptance | 0.49 | 3.3 |
| Example 4-5 | 262 | 262 | Acceptance | 0.48 | 3.26 |
| Example 4-6 | 263 | 259 | Acceptance | 0.42 | 3.24 |
| Example 4-7 | 267 | 254 | Acceptance | 0.37 | 3.13 |
| Example 4-8 | 274 | 249 | Acceptance | 0.33 | 3.04 |
| Example 4-9 | 272 | 252 | Acceptance | 0.34 | 3.08 |
| Example 4-10 | 279 | 241 | Acceptance | 0.28 | 2.87 |
| Comparative Example 4-1 | 245 | 284 | Acceptance | 0.58 | 3.98 |
| Comparative Example 4-2 | 251 | 274 | Acceptance | 0.55 | 3.42 |

The density, size and specific surface area of the graphene microspheres have a great influence on the properties of the final composite grease. If the voids increase, the compressive strength, modulus, and elastic resilience of the microspheres decrease, and the effect of lubricating when acting on a friction surface is also reduced. Moreover, the dispersion is easier to become stable as the particle size decreases. Therefore, in view of the above, more compact graphene microspheres are needed. In the present invention, the densification of the graphene microspheres are achieved by controlling the reducing parameters in each step, thereby effectively improving the comprehensive performances of the grease.

Example 4-10

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

(4) 5 parts of the paper ball-like graphene microspheres obtained in Step (3), 58 parts of a base oil, and 17.8 parts of stearic acid were mixed, and heated to 100° C. Barium hydroxide was added for saponification.

(5) The mixture obtained in Step (4) was heated to 155° C., dehydrated, and further heated to 200° C. for refining. After cooling to 120° C., 0.6 part of an antioxidant, 1.4 parts of a rust inhibitor, 1 part of a surfactant, and 31 parts of a base oil were added, mixed and ground to obtain a barium-based grease comprising paper ball-like graphene microspheres.

Through the above steps, a barium-based grease comprising paper ball-like graphene microspheres is obtained. The paper ball-like graphene microsphere is microscopically a pleated microsphere having a diameter of 500 nm to 3 μm. Since Steps (1)-(3) are the same as those in Example 4-8, the graphene microsphere has the same carbon/oxygen ratio, density, and specific surface area as in Example 4-8. Specific properties are shown in Table 4. It can be found that increasing the amount of graphene microspheres added can further enhance various performance of the grease.

Example 5-1

Steps 1-3 are the same as those in Example 1-1.

Step 4: 0.2 part of the paper ball-like graphene microsphere obtained in Step (3), 100 parts of butadiene rubber, 5 parts of vulcanization accelerator TMTD, 2 parts of stearic acid, 1 part of an anti-aging agent, 2 parts of liquid paraffin, and 4 parts of zinc oxide were mixed in an internal mixer for 15 min at a mixing temperature of 70° C., and then stood for 6 hrs.

Step 5: The mixture obtained in Step (4) and 4 parts of sulfur were mixed in an open mill at 60° C., and finally vulcanized on a plate vulcanizer at 160° C. for 30 min, to obtain a compounded rubber modified with paper ball-like graphene microspheres.

Through the above steps, a compounded rubber modified with paper ball-like graphene microspheres is obtained. The performances of the resulting rubber are shown in Table 5.

Example 5-2

Steps 1-3 are the same as those in Example 1-2.

Step 4: 0.2 part of the paper ball-like graphene microsphere obtained in Step (3), 100 parts of butadiene rubber, 6 parts of vulcanization accelerator TMTD, 2 parts of stearic acid, 1 part of an anti-aging agent, 2 parts of liquid paraffin, and 4 parts of zinc oxide were mixed in an internal mixer for 15 min at a mixing temperature of 70° C., and then stood for 6 hrs.

Step 5: The mixture obtained in Step (4) and 3.5 parts of sulfur were mixed in an open mill at 60° C., and finally vulcanized on a plate vulcanizer at 160° C. for 30 min, to obtain a compounded rubber modified with paper ball-like graphene microspheres.

Through the above steps, a compounded rubber modified with paper ball-like graphene microspheres is obtained. The performances of the resulting rubber are shown in Table 5.

Example 5-3

Steps 1-3 are the same as those in Example 1-3.

Step 4: 0.2 part of the paper ball-like graphene microsphere obtained in Step (3), 100 parts of butadiene rubber, 8 parts of vulcanization accelerator TMTD, 1.5 parts of stearic acid, 1 part of an anti-aging agent, 2 parts of liquid paraffin, and 4 parts of zinc oxide were mixed in an internal mixer for 15 min at a mixing temperature of 70° C., and then stood for 6 hrs.

Step 5: The mixture obtained in Step (4) and 4 parts of sulfur were mixed in an open mill at 60° C., and finally vulcanized on a plate vulcanizer at 160° C. for 30 min, to obtain a compounded rubber modified with paper ball-like graphene microspheres.

Through the above steps, a compounded rubber modified with paper ball-like graphene microspheres is obtained. The performances of the resulting rubber are shown in Table 5.

A lower specific surface area and a higher density of the paper ball-like graphene microsphere means a more compact structure, and a better pressure resistance and elasticity, whereby the overall performances are much better after compounding with rubber, as shown in Table 5. Therefore, in view of the above, the reducing conditions in Step (2) are preferably high reduction temperature and long reduction time.

Example 5-4

Steps 1-3 are the same as those in Example 1-4.

Step 4: 0.1 part of the paper ball-like graphene microsphere obtained in Step (3), 100 parts of butadiene rubber, 4 parts of vulcanization accelerator TMTD, 2 parts of stearic acid, 1 part of an anti-aging agent, 1.5 parts of liquid paraffin, and 4 parts of zinc oxide were mixed in an internal mixer for 30 min at a mixing temperature of 80° C., and then stood for 5 hrs.

Step 5: The mixture obtained in Step (4) and 3 parts of a vulcanizing agent were mixed in an open mill at 80° C., and finally vulcanized on a plate vulcanizer at 170° C. for 20 min, to obtain a compounded rubber modified with paper ball-like graphene microspheres.

Through the above steps, a compounded rubber modified with paper ball-like graphene microspheres is obtained. Specific properties are shown in Table 5.

Example 5-5

Steps 1-3 are the same as those in Example 1-5.

Step 4: 0.3 part of the paper ball-like graphene microsphere obtained in Step (3), 100 parts of butadiene rubber, 4 parts of vulcanization accelerator TMTD, 2 parts of stearic acid, 1 part of an anti-aging agent, 1.5 parts of liquid paraffin, and 4 parts of zinc oxide were mixed in an internal mixer for 30 min at a mixing temperature of 80° C., and then stood for 5 hrs.

Step 5: The mixture obtained in Step (4) and 3 parts of a vulcanizing agent were mixed in an open mill at 80° C., and finally vulcanized on a plate vulcanizer at 170° C. for 20 min, to obtain a compounded rubber modified with paper ball-like graphene microspheres.

Through the above steps, a compounded rubber modified with paper ball-like graphene microspheres is obtained. Specific properties are shown in Table 5.

Example 5-6

Steps 1-3 are the same as those in Example 1-6.

Step 4: 0.3 part of the paper ball-like graphene microsphere obtained in Step (3), 100 parts of butadiene rubber, 4 parts of vulcanization accelerator TMTD, 2 parts of stearic acid, 1 part of an anti-aging agent, 1.5 parts of liquid paraffin, and 4 parts of zinc oxide were mixed in an internal mixer for 30 min at a mixing temperature of 80° C., and then stood for 5 hrs.

Step 5: The mixture obtained in Step (4) and 3 parts of a vulcanizing agent were mixed in an open mill at 80° C., and finally vulcanized on a plate vulcanizer at 180° C. for 30 min, to obtain a compounded rubber modified with paper ball-like graphene microspheres.

Through the above steps, a compounded rubber modified with paper ball-like graphene microspheres is obtained. Specific properties are shown in Table 5.

Example 5-7

Steps 1-3 are the same as those in Example 1-7.

Step 4: 0.2 part of the paper ball-like graphene microsphere obtained in Step (3), 100 parts of butadiene rubber, 8 parts of vulcanization accelerator TMTD, 2 parts of stearic acid, 1 part of an anti-aging agent, 1.5 parts of liquid paraffin, and 4 parts of zinc oxide were mixed in an internal mixer for 30 min at a mixing temperature of 80° C., and then stood for 5 hrs.

Step 5: The mixture obtained in Step (4) and 4 parts of a vulcanizing agent were mixed in an open mill at 80° C., and finally vulcanized on a plate vulcanizer at 180° C. for 30 min, to obtain a compounded rubber modified with paper ball-like graphene microspheres.

Through the above steps, a compounded rubber modified with paper ball-like graphene microspheres is obtained. Specific properties are shown in Table 5.

Example 5-8

Steps 1-3 are the same as those in Example 1-8.

Step 4: 0.2 part of the paper ball-like graphene microsphere obtained in Step (3), 100 parts of butadiene rubber, 8 parts of vulcanization accelerator TMTD, 2 parts of stearic acid, 1 part of an anti-aging agent, 1.5 parts of liquid paraffin, and 4 parts of zinc oxide were mixed in an internal mixer for 30 min at a mixing temperature of 80° C., and then stood for 5 hrs.

Step 5: The mixture obtained in Step (4) and 4 parts of a vulcanizing agent were mixed in an open mill at 80° C., and finally vulcanized on a plate vulcanizer at 180° C. for 30 min, to obtain a compounded rubber modified with paper ball-like graphene microspheres.

Through the above steps, a compounded rubber modified with paper ball-like graphene microspheres is obtained. Specific properties are shown in Table 5.

Example 5-9

Steps 1-3 are the same as those in Example 1-9.

Step 4: 0.2 part of the paper ball-like graphene microsphere obtained in Step (3), 100 parts of butadiene rubber, 7 parts of vulcanization accelerator TMTD, 1 parts of stearic acid, 1 part of an anti-aging agent, 2.5 parts of liquid paraffin, and 4 parts of zinc oxide were mixed in an internal mixer for 30 min at a mixing temperature of 80° C., and then stood for 5 hrs.

Step 5: The mixture obtained in Step (4) and 4 parts of a vulcanizing agent were mixed in an open mill at 80° C., and finally vulcanized on a plate vulcanizer at 160° C. for 15 min, to obtain a compounded rubber modified with paper ball-like graphene microspheres.

Through the above steps, a compounded rubber modified with paper ball-like graphene microspheres is obtained. Specific properties are shown in Table 5.

Comparative Example 5-1: A compounded rubber was prepared following the method as described in Example 5-1, except that no paper ball-like graphene microspheres were added during preparation. The performances are shown in Table 5.

Comparative Example 5-2: Direct thermal reduction of graphene oxide microspheres without chemical reduction (1) A Single-layer graphene oxide dispersion was dried by atomization drying at a temperature of 130° C. to obtain graphene oxide microspheres.

(2) The graphene oxide microspheres obtained in Step (1) were transferred to a tubular furnace, and heated to 3000° C. at a ramping rate of 5° C./min and maintained for 1 hr, while a mixed gas of hydrogen and argon was continuously introduced.

(3) 0.2 part of the graphene obtained in Step (2), 100 parts of butadiene rubber, 8 parts of vulcanization accelerator TMTD, 2 parts of stearic acid, 1 part of an anti-aging agent, 1.5 parts of liquid paraffin, and 4 parts of zinc oxide were mixed in an internal mixer for 30 min at a mixing temperature of 80° C., and then stood for 5 hrs.

(4) The mixture obtained in Step (3) and 4 parts of a vulcanizing agent were mixed in an open mill at 80° C., and finally vulcanized on a plate vulcanizer at 180° C. for 30 min, to obtain a compounded rubber modified with graphene.

The graphene obtained through the above steps appears as a black loose powder, and is microscopically a hollow sphere having a diameter of 1-10 μm. The performances are shown in Table 5.

TABLE 5

| | Friction performances | | | |
|---|---|---|---|---|
| | Wear resistance | Tensile strength (MPa) | Tearing strength (kN m$^{-1}$) | Softening temperature (° C.) |
| Example 5-1 | Excellent | 19.9 | 14.1 | 207 |
| Example 5-2 | Excellent | 20.5 | 14.4 | 207 |
| Example 5-3 | Excellent | 21 | 14.7 | 209 |
| Example 5-4 | Excellent | 22.3 | 15.1 | 211 |
| Example 5-5 | Excellent | 22.8 | 16.6 | 214 |
| Example 5-6 | Excellent | 23.5 | 18.3 | 218 |
| Example 5-7 | Excellent | 24.4 | 20.7 | 223 |
| Example 5-8 | Excellent | 26.8 | 22.8 | 226 |
| Example 5-9 | Excellent | 25.3 | 21.6 | 222 |
| Example 5-10 | Excellent | 29.6 | 24.5 | 234 |
| Comparative Example 5-1 | Good | 18.5 | 9.6 | 193 |
| Comparative Example 5-2 | Good | 19.6 | 13.6 | 205 |

The performance of graphene reinforced rubber is closely related to the performance of the filler. A higher density and a larger specific surface area of the filled paper ball-like graphene microsphere means a more compact structure, fewer voids, more stable structure, and better performance in impact absorption, elastic resilience and wear resistance Moreover, the dispersion is easier to become stable as the particle size decreases. Therefore, in view of the above, more compact graphene microspheres are needed. In the present invention, the densification, structural integrity and performance optimization of the graphene microspheres are achieved by controlling the reducing parameters in each step, thereby effectively improving the comprehensive performances of the compounded rubber.

Example 5-10

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

(4) 0.2 part of the paper ball-like graphene microsphere obtained in Step (3), 100 parts of butadiene rubber, 8 parts of vulcanization accelerator TMTD, 2 parts of stearic acid, 1 part of an anti-aging agent, 1.5 parts of liquid paraffin, and 4 parts of zinc oxide were mixed in an internal mixer for 30 min at a mixing temperature of 80° C., and then stood for 5 hrs.

(5) The mixture obtained in Step (4) and 4 parts of a vulcanizing agent were mixed in an open mill at 80° C., and finally vulcanized on a plate vulcanizer at 180° C. for 30 min, to obtain a compounded rubber modified with paper ball-like graphene microspheres.

Through the above steps, a compounded rubber modified with paper ball-like graphene microspheres is obtained. The paper ball-like graphene microsphere is microscopically a pleated microsphere having a diameter of 500 nm to 3 µm. Since Steps (1)-(3) are the same as those in Example 5-8, the graphene microsphere has the same carbon/oxygen ratio, density, and specific surface area as in Example 5-8. Specific properties are shown in Table 5. It can be found that increasing the amount of graphene microspheres added can further enhance the various properties of the rubber.

Example 6-1

Steps 1-3 are the same as those in Example 1-1.
Step 4: 0.3 part of the paper ball-like graphene microspheres obtained in Step (3) and 100 parts of pure acrylic emulsion were stirred until uniform and ultrasonically dispersed. Then, 15 parts of water, 0.3 part of a dispersing agent, 0.1 part of a preservative, 0.3 part of a film forming agent, 0.1 part of a leveling agent, 4 parts of a thickener, 0.3 part of a deforming agent, 10 parts of calcium carbonate, 10 parts of alumina, and 15 parts of titania were added in sequence, stirred at a high speed, and defoamed.

Through the above steps, a graphene-based waterborne acrylic coating is obtained. The performances of the obtained coating are shown in Table 6.

Example 6-2

Steps 1-3 are the same as those in Example 1-2.
Step 4: 0.3 part of the paper ball-like graphene microspheres obtained in Step (3) and 100 parts of pure acrylic emulsion were stirred until uniform and ultrasonically dispersed. Then, 15 parts of water, 0.3 part of a dispersing agent, 0.1 part of a preservative, 0.3 part of a film forming agent, 0.1 part of a leveling agent, 4 parts of a thickener, 0.3 part of a deforming agent, 10 parts of calcium carbonate, 10 parts of alumina, and 15 parts of titania were added in sequence, stirred at a high speed, and defoamed.

Through the above steps, a graphene-based waterborne acrylic coating is obtained. The performances of the obtained coating are shown in Table 6.

Example 6-3

Steps 1-3 are the same as those in Example 1-3.
Step 4: 0.3 part of the paper ball-like graphene microspheres obtained in Step (3) and 100 parts of pure acrylic emulsion were stirred until uniform and ultrasonically dispersed. Then, 15 parts of water, 0.3 part of a dispersing agent, 0.1 part of a preservative, 0.3 part of a film forming agent, 0.1 part of a leveling agent, 4 parts of a thickener, 0.3 part of a deforming agent, 10 parts of calcium carbonate, 10 parts of alumina, and 15 parts of titania were added in sequence, stirred at a high speed, and defoamed.

Through the above steps, a graphene-based waterborne acrylic coating is obtained. The performances of the obtained coating are shown in Table 6.

A lower specific surface area and a higher density of the paper ball-like graphene microsphere means a more compact structure, and a better pressure resistance and elasticity, whereby the overall performance after film formation with the coating is much better, as shown in Table 6. Therefore, in view of the above, the reducing conditions in Step (2) are preferably high reduction temperature and long reduction time.

Example 6-4

Steps 1-3 are the same as those in Example 1-4.
Step 4: 0.2 part of the paper ball-like graphene microspheres obtained in Step (3) and 100 parts of pure acrylic emulsion were stirred until uniform and ultrasonically dispersed. Then, 15 parts of water, 0.3 part of a dispersing agent, 0.1 part of a preservative, 0.3 part of a film forming agent, 0.1 part of a leveling agent, 4 parts of a thickener, 0.3 part of a deforming agent, 15 parts of calcium carbonate, and 20 parts of titania were added in sequence, stirred at a high speed, and defoamed.

Through the above steps, a graphene-based waterborne acrylic coating is obtained. Specific properties are shown in Table 6.

Example 6-5

Steps 1-3 are the same as those in Example 1-5.
Step 4: 0.4 part of the paper ball-like graphene microspheres obtained in Step (3) and 100 parts of vinyl acetate-acrylic emulsion were stirred until uniform and ultrasonically dispersed. Then, 18 parts of water, 0.3 part of a dispersing agent, 0.1 part of a preservative, 0.3 part of a film forming agent, 0.1 part of a leveling agent, 5 parts of a thickener, 0.1 part of a deforming agent, 5 parts of calcium carbonate, 8 parts of alumina, and 18 parts of titania were added in sequence, stirred at a high speed, and defoamed.

Through the above steps, a graphene-based waterborne acrylic coating is obtained. Specific properties are shown in Table 6.

Example 6-6

Steps 1-3 are the same as those in Example 1-6.
Step 4: 0.4 part of the paper ball-like graphene microspheres obtained in Step (3) and 100 parts of vinyl acetate-acrylic emulsion were stirred until uniform and ultrasonically dispersed. Then, 12 parts of water, 0.3 part of a dispersing agent, 0.1 part of a preservative, 0.3 part of a film forming agent, 0.1 part of a leveling agent, 5 parts of a thickener, 0.1 part of a deforming agent, 30 parts of calcium carbonate, and 18 parts of titania were added in sequence, stirred at a high speed, and defoamed.

Through the above steps, a graphene-based waterborne acrylic coating is obtained. Specific properties are shown in Table 6.

Example 6-7

Steps 1-3 are the same as those in Example 1-7.
Step 4: 0.5 part of the paper ball-like graphene microspheres obtained in Step (3) and 100 parts of vinyl acetate-acrylic emulsion were stirred until uniform and ultrasonically dispersed. Then, 20 parts of water, 0.5 part of a dispersing agent, 0.1 part of a preservative, 0.3 part of a film forming agent, 0.2 part of a leveling agent, 10 parts of a thickener, 0.1 part of a deforming agent, 30 parts of calcium carbonate, 10 parts of alumina, and 18 parts of titania were added in sequence, stirred at a high speed, and defoamed.

Through the above steps, a graphene-based waterborne acrylic coating is obtained. Specific properties are shown in Table 6.

Example 6-8

Steps 1-3 are the same as those in Example 1-8.

Step 4: 0.5 part of the paper ball-like graphene microspheres obtained in Step (3) and 100 parts of vinyl acetate-acrylic emulsion were stirred until uniform and ultrasonically dispersed. Then, 18 parts of water, 0.3 part of a dispersing agent, 0.1 part of a preservative, 0.3 part of a film forming agent, 0.1 part of a leveling agent, 5 parts of a thickener, 0.1 part of a deforming agent, 25 parts of calcium carbonate, 8 parts of alumina, and 16 parts of titania were added in sequence, stirred at a high speed, and defoamed.

Through the above steps, a graphene-based waterborne acrylic coating is obtained. Specific properties are shown in Table 6.

Example 6-9

Steps 1-3 are the same as those in Example 1-9.

Step 4: 0.5 part of the paper ball-like graphene microspheres obtained in Step (3) and 100 parts of styrene-acrylic emulsion were stirred until uniform and ultrasonically dispersed. Then, 14 parts of water, 0.3 part of a dispersing agent, 0.1 part of a preservative, 0.3 part of a film forming agent, 0.1 part of a leveling agent, 5 parts of a thickener, 0.1 part of a deforming agent, 20 parts of calcium carbonate, 8 parts of alumina, and 14 parts of titania were added in sequence, stirred at a high speed, and defoamed.

Comparative Example 6-1: A waterborne acrylic coating was prepared following the method as described in Example 6-1 except that no paper ball-like graphene microspheres were added during the preparation. The performances are shown in Table 6.

Comparative Example 6-2: Direct thermal reduction of graphene oxide microspheres without chemical reduction (1) A single-layer graphene oxide dispersion was dried by atomization drying at a temperature of 130° C. to obtain graphene oxide microspheres.

(2) The graphene oxide microspheres obtained in Step (1) were transferred to a tubular furnace, and heated to 3000° C. at a ramping rate of 5° C./min and maintained for 1 hr, while a mixed gas of hydrogen and argon was continuously introduced.

(3) 0.3 part of the graphene obtained in Step (2) and 100 parts of pure acrylic emulsion were stirred until uniform and ultrasonically dispersed. Then, 15 parts of water, 0.3 part of a dispersing agent, 0.1 part of a preservative, 0.3 part of a film forming agent, 0.1 part of a leveling agent, 4 parts of a thickener, 0.3 part of a deforming agent, 10 parts of calcium carbonate, 10 parts of alumina, and 15 parts of titania were added in sequence, stirred at a high speed, and defoamed.

The graphene obtained through the above steps appears as a black loose powder, and is microscopically a hollow sphere having a diameter of 1-10 μm. The performances are shown in FIG. 6.

TABLE 6

Friction performances

| | Film forming ability | Adhesion | Impact strength (kg · cm) | Rubbing number (r) | Hardness |
|---|---|---|---|---|---|
| Example 6-1 | Excellent | 1 | 113 | 550 | H |
| Example 6-2 | Excellent | 1 | 116 | 610 | H |
| Example 6-3 | Excellent | 1 | 120 | 640 | H |
| Example 6-4 | Excellent | 1 | 122 | 710 | H |
| Example 6-5 | Excellent | 1 | 126 | 790 | H |
| Example 6-6 | Excellent | 1 | 129 | 820 | H |
| Example 6-7 | Excellent | 1 | 134 | 870 | H |
| Example 6-8 | Excellent | 1 | 137 | 890 | H |
| Example 6-9 | Excellent | 1 | 136 | 875 | H |
| Example 6-10 | Excellent | 1 | 148 | 940 | H |
| Comparative Example 6-1 | Excellent | 1 | 90 | 450 | 2B |
| Comparative Example 6-2 | Excellent | 2 | 104 | 530 | H |

Note:
The wear resistance of the coating film is tested in accordance with GB/T18103-2013 "Engineered wood flooring". The adhesion of the coating film is tested in accordance with GB/T9286-1998 "Paints and varnishes Cross cut test for films".

Although the mechanical properties of the coating can be improved to some extent after the addition of the coating, the adhesion is decreased due to the presence of expanded graphene sheet. From the viewpoint of coating properties, the hardness, impact strength and wear resistance of the coating are greatly improved after adding the paper ball-like graphene microsphere. Moreover, increasing the density and reducing the size and specific surface area of the graphene microspheres are more favorable for performances of the final graphene-based waterborne acrylic coating. This is because when the pores in the microspheres are excessive, the compressive strength, modulus, and elastic resilience of the microspheres are lowered, and the performance in the coating film is deteriorated. Moreover, the dispersion is easier to become stable as the particle size decreases. Therefore, in view of the above, more compact graphene microspheres are needed. In the present invention, the densification of the graphene microspheres are achieved by controlling the reducing parameters in each step, thereby effectively improving the comprehensive performances of the coating.

Example 6-10

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

(4) 5 parts of the paper ball-like graphene microspheres obtained in Step (3) and 100 parts of vinyl acetate-acrylic emulsion were stirred until uniform and ultrasonically dispersed. Then, 18 parts of water, 0.3 part of a dispersing agent, 0.1 part of a preservative, 0.3 part of a film forming agent, 0.1 part of a leveling agent, 5 parts of a thickener, 0.1 part of a deforming agent, 25 parts of calcium carbonate, 8 parts of alumina, and 16 parts of titania were added in sequence, stirred at a high speed, and defoamed.

Through the above steps, a graphene-based waterborne acrylic coating is obtained. The paper ball-like graphene microsphere is microscopically a pleated microsphere having a diameter of 500 nm to 3 μm. Since Steps (1)-(3) are the same as those in Example 6-8, the graphene microsphere has the same carbon/oxygen ratio, density, and specific surface area as in Example 6-8. Specific properties are shown in Table 6. It can be found that increasing the amount of graphene microspheres added can further enhance the various properties of the coating.

Example 7-1

Steps 1-3 are the same as those in Example 1-1.
Step 4: 0.2 part of paper ball-like graphene microspheres was added to 100 parts of molten caprolactam monomer, and stirred and heated to 120° C. Water was removed by distillation under reduced pressure, and 0.15 part of sodium hydroxide was added, heated to 140° C. Water was removed by distillation under reduced pressure for 30 min, and the remainder was heated to 155° C.
Step 5: 0.35 part of the cocatalyst tolyl 2,4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.
Through the above steps, a graphene/cast nylon composite material is obtained. The properties of the obtained composite material are shown in Table 7.

Example 7-2

Steps 1-3 are the same as those in Example 1-2.
Step 4: 0.2 part of paper ball-like graphene microspheres was added to 100 parts of molten caprolactam monomer, and stirred and heated to 120° C. Water was removed by distillation under reduced pressure, and 0.15 part of sodium hydroxide was added, heated to 140° C. Water was removed by distillation under reduced pressure for 30 min, and the remainder was heated to 155° C.
Step 5: 0.35 part of the cocatalyst tolyl 2,4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.
Through the above steps, a graphene/cast nylon composite material is obtained. The properties of the obtained composite material are shown in Table 7.

Example 7-3

Steps 1-3 are the same as those in Example 1-3.
Step 4: 0.2 part of paper ball-like graphene microspheres was added to 100 parts of molten caprolactam monomer, and stirred and heated to 120° C. Water was removed by distillation under reduced pressure, and 0.15 part of sodium hydroxide was added, heated to 140° C. Water was removed by distillation under reduced pressure for 30 min, and the remainder was heated to 155° C.
Step 5: 0.35 part of the cocatalyst tolyl 2,4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.
Through the above steps, a graphene/cast nylon composite material is obtained. The properties of the obtained composite material are shown in Table 7.

A large specific surface area of the paper ball-like graphene microsphere is not conducive to the process of cast polymerization, and tends to cause phase separation, cracking, too high viscosity and even difficulty in polymerization. Moreover, the mechanical properties are weaker than the situation where more compact graphene microspheres are used. Therefore, in view of the above, the reducing conditions in Step (2) are preferably high reduction temperature and long reduction time.

Example 7-4

Steps 1-3 are the same as those in Example 1-4.
Step 4: 0.3 part of paper ball-like graphene microspheres was added to 100 parts of molten caprolactam monomer, and stirred and heated to 120° C. Water was removed by distillation under reduced pressure, and 0.15 part of sodium hydroxide was added, heated to 140° C. Water was removed by distillation under reduced pressure for 30 min, and the remainder was heated to 155° C.
Step 5: 0.35 part of the cocatalyst tolyl 2,4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.
Through the above steps, a graphene/cast nylon composite material is obtained. Specific properties of the material are shown in Table 7.

Example 7-5

Steps 1-3 are the same as those in Example 1-5.
Step 4: 0.5 part of paper ball-like graphene microspheres was added to 100 parts of molten caprolactam monomer, and stirred and heated to 120° C., Water was removed by distillation under reduced pressure, and 0.15 part of sodium hydroxide was added, heated to 140° C. Water was removed by distillation under reduced pressure for 30 min, and the remainder was heated to 155° C.
Step 5: 0.35 part of the cocatalyst tolyl 2,4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.
Through the above steps, a graphene/cast nylon composite material is obtained. Specific properties of the material are shown in Table 7.

Example 7-6

Steps 1-3 are the same as those in Example 1-6.
Step 4: 0.4 part of paper ball-like graphene microspheres was added to 100 parts of molten caprolactam monomer, and stirred and heated to 120° C. Water was removed by distillation under reduced pressure, and 0.15 part of sodium hydroxide was added, heated to 140° C. Water was removed by distillation under reduced pressure for 30 min, and the remainder was heated to 155° C.
Step 5: 035 part of the cocatalyst tolyl 2,4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.

Through the above steps, a graphene/cast nylon composite material is obtained. Specific properties of the material are shown in Table 7.

Example 7-7

Steps 1-3 are the same as those in Example 1-7.

Step 4: 0.3 part of paper ball-like graphene microspheres was added to 100 parts of molten caprolactam monomer, and stirred and heated to 120° C. Water was removed by distillation under reduced pressure, and 0.15 part of sodium hydroxide was added, heated to 140° C. Water was removed by distillation under reduced pressure for 30 min, and the remainder was heated to 155° C.

Step 5: 0.35 part of the cocatalyst tolyl 2,4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.

Through the above steps, a graphene/cast nylon composite material is obtained. Specific properties of the material are shown in Table 7.

Example 7-8

Steps 1-3 are the same as those in Example 1-8.

Step 4: 0.3 part of paper ball-like graphene microspheres was added to 100 parts of molten caprolactam monomer, and stirred and heated to 12.0° C. Water was removed by distillation under reduced pressure, and 0.15 part of sodium hydroxide was added, heated to 140° C. Water was removed by distillation under reduced pressure for 30 min, and the remainder was heated to 155° C.

Step 5: 0.35 part of the cocatalyst tolyl 2,4-diisocyanate (TIM) was added to the mixture obtained in Step (4), stirred until uniform, casted into a mold preheated at 165° C., maintained at this temperature for 30 min, cooled, and released from the mold to obtain a graphene/cast nylon composite material.

Through the above steps, a graphene/cast nylon composite material is obtained. Specific properties of the material are shown in Table 7.

Example 7-9

Steps 1-3 are the same as those in Example 1-9.

Step 4: 0.3 part of paper ball-like graphene microspheres was added to 100 parts of molten caprolactam monomer, and stirred and heated to 120° C. Water was removed by distillation under reduced pressure, and 0.15 part of sodium hydroxide was added, heated to 140° C. Water was removed by distillation under reduced pressure for 30 min, and the remainder was heated to 155° C.

Step 5: 0.35 part of the cocatalyst tolyl 2,4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.

Through the above steps, a graphene/cast nylon composite material is obtained. Specific properties of the material are shown in Table 7.

Comparative Example 7-1: A graphene/cast nylon composite material was prepared following the method as described in Example 7-1 except that no paper ball-like graphene microspheres were added during the preparation. The performances are shown in Table 7.

Comparative Example 7-2: Direct thermal reduction of graphene oxide microspheres without chemical reduction (1) A single-layer graphene oxide dispersion was dried by atomization drying at a temperature of 130° C. to obtain graphene oxide microspheres.

(2) The graphene oxide microspheres obtained in Step (1) were transferred to a tubular furnace, and heated to 3000° C. at a ramping rate of 5° C./min and maintained for 1 hr, while a mixed gas of hydrogen and argon was continuously introduced.

(3) 0.3 part of paper ball-like graphene microspheres were added to 100 parts of molten caprolactam monomer, stirred and heated to 120° C., Water was removed by distillation under reduced pressure, and 0.15 part of sodium hydroxide was added, and heated to 140° C. Water was removed by distillation under reduced pressure for 30 min, and the remainder was heated to 155° C.

(4) 0.35 part of the cocatalyst tolyl 2, 4-diisocyanate (TDI) was added to the mixture obtained in Step (3), stirred until uniform, casted into a mold preheated at 165° C., maintained at this temperature for 30 min, cooled, and released from the mold to obtain a graphene/cast nylon composite material.

The graphene obtained through the above steps appears as a black loose powder, and is microscopically a hollow sphere having a diameter of 1-10 μm. Specific properties of the obtained composite material are shown in Table 7.

When compounded with nylon 6, the microspheres with lower specific surface area and higher density have better mechanical strength and shape stability, and have less impact on the process of cast polymerization. Therefore, the compact graphene microspheres obtained by addition of a reducing agent in the first step of spray drying, chemical reduction in the second step, and high-temperature thermal treatment in the third step have the best reinforcing effect on cast nylon, and improve the mechanical properties, tribological properties and heat distortion temperature of the material.

TABLE 7

Comprehensive indices of composite materials

| | Tensile strength (MPa) | Elongation at break (1%) | Impact strength (KJ/m$^2$) | Heat distortion temperature (° C.) | Friction coefficient |
|---|---|---|---|---|---|
| Example 7-1 | 60.1 | 103 | 5.2 | 127 | 0.37 |
| Example 7-2 | 60.7 | 106 | 5.5 | 119 | 0.35 |
| Example 7-3 | 60.9 | 104 | 5.6 | 124 | 0.32 |
| Example 7-4 | 61.4 | 101 | 6.3 | 126 | 0.28 |
| Example 7-5 | 62.1 | 108 | 7.8 | 129 | 0.27 |
| Example 7-6 | 63.2 | 98 | 8.9 | 131 | 0.24 |
| Example 7-7 | 65.8 | 95 | 9.2 | 136 | 0.22 |
| Example 7-8 | 67.9 | 93 | 9.4 | 143 | 0.19 |
| Example 7-9 | 66.2 | 99 | 9 | 135 | 0.23 |
| Example 7-10 | 69.5 | 74 | 9.8 | 146 | 0.15 |
| Example 7-11 | 72.7 | 46 | 10.3 | 151 | 0.12 |
| Comparative Example 7-1 | 56.2 | 112 | 4.6 | 106 | 0.43 |
| Comparative Example 7-2 | 59.3 | 21 | 6.9 | 125 | 0.38 |

Example 7-10

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

(4) 1.5 parts of paper ball-like graphene microspheres were added to 100 parts of molten caprolactam monomer, stirred and heated to 120° C. Water was removed by distillation under reduced pressure, and 0.15 part of sodium hydroxide was added, and heated to 140° C. Water was removed by distillation under reduced pressure for 30 min, and the remainder was heated to 155° C.

(5) 0.35 part of the cocatalyst tolyl 2, 4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.

A graphene/cast nylon composite material is obtained through the above steps. The paper ball-like graphene microsphere is microscopically a pleated microsphere having a diameter of 500 nm to 3 μm. Since Steps (1)-(3) are the same as those in Example 7-8, the graphene microsphere has the same carbon/oxygen ratio, density, and specific surface area as in Example 7-8. Specific properties are shown in Table 7.

Example 7-11

(1) A single-layer graphene oxide dispersion containing vitamin C was dried by atomization drying at a temperature of 130° C. to obtain graphene oxide microspheres, where the weight ratio of vitamin C to graphene oxide is 1.

(2) The graphene oxide microspheres obtained in Step (1) were reduced for 24 hrs at 90° C. under hydrazine hydrate vapor to obtain reduced graphene oxide microspheres.

(3) The reduced graphene oxide microspheres obtained in Step (2) were transferred to a tubular furnace, and heated to 3000° C. for 1 hr while nitrogen was continuously introduced, to obtain paper ball-like graphene microspheres.

(4) 5 parts of paper ball-like graphene microspheres were added to 100 parts of molten caprolactam monomer, stirred and heated to 120° C. Water was removed by distillation under reduced pressure, and 0.15 part of sodium hydroxide was added, and heated to 140° C. Water was removed by distillation under reduced pressure for 30 min, and the remainder was heated to 155° C.;

(5) 0.35 part of the cocatalyst tolyl 2, 4-diisocyanate (TDI) was added to the mixture obtained in Step (4), stirred until uniform, casted into a mold preheated at 165° C., maintained at this temperature for 30 min, cooled, and released from the mold to obtain a graphene/cast nylon composite material.

A graphene/cast nylon composite material is obtained through the above steps. The paper ball-like graphene microsphere is microscopically a pleated microsphere having a diameter of 500 nm to 3 μm. Since Steps (1)-(3) are the same as those in Example 7-8, the graphene microsphere has the same carbon/oxygen ratio, density, and specific surface area as in Example 7-8. Specific properties are shown in Table 7.

By comparing Examples 7-8, 7-10, and 7-11, it can be seen that most of the indices of the composite material are improved with the increase of the amount of the paper ball-like graphene microspheres, indicating that further increasing the amount can further optimize the performances, but the elongation at break is deteriorated, so an appropriate amount needs to be determined after in view of the above in practical applications.

Example 8-1

Steps 1-3 are the same as those in Example 1-1.

Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.

Step 5: The premix obtained in Step (4) was melt-blended and extruded through a twin-screw extruder, where the melting temperature was 250° C., and the rotation speed of the screw was 200 rpm.

The compounded material was injection molded by an injection molding machine into a standard test strip for mechanical property test. The graphene-toughened nylon 6 composite material was tested to have a notched Izod impact strength of 25.44 KJ/m$^2$ at normal temperature.

Example 8-2

Steps 1-3 are the same as those in Example 1-2.

Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.

Step 5: The premix obtained in Step (4) was melt-blended and extruded through a twin-screw extruder, where the melting temperature was 250° C., and the rotation speed of the screw was 200 rpm.

The compounded material was injection molded by an injection molding machine into a standard test strip for mechanical property test. The graphene-toughened nylon 6 composite material was tested to have a notched Izod impact strength of 26.56 KJ/m$^2$ at normal temperature.

Example 8-3

Steps 1-3 are the same as those in Example 1-3.

Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.

Step 5: The premix obtained in Step (4) was melt-blended and extruded through a twin-screw extruder, where the melting temperature was 250° C., and the rotation speed of the screw was 200 rpm.

The compounded material was injection molded by an injection molding machine into a standard test strip for mechanical property test. The graphene-toughened nylon 6 composite material was tested to have a notched Izod impact strength of 27.15 KJ/m$^2$ at normal temperature.

When the specific surface area of the paper ball-like graphene microsphere is large, the dispersion of the graphene powder becomes poor, and the toughening effect is affected. Therefore, in view of the above, the reduction conditions in the second step are preferably a high reduction temperature and a long reduction time.

Example 8-4

Steps 1-3 are the same as those in Example 1-4.
Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.
Step 5: The premix obtained in Step (4) was melt-blended and extruded through a twin-screw extruder, where the melting temperature was 250° C., and the rotation speed of the screw was 200 rpm.
A graphene-toughened nylon 6 composite material was obtained through the above steps. The compounded material was injection molded by an injection molding machine into a standard test strip for mechanical property test. The graphene-toughened nylon 6 composite material was tested to have a notched Izod impact strength of 29.80 $KJ/m^2$ at normal temperature.

Example 8-5

Steps 1-3 are the same as those in Example 1-5.
Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.
Step 5: The premix obtained in Step (4) was melt-blended and extruded through a twin-screw extruder, where the melting temperature was 250° C., and the rotation speed of the screw was 200 rpm.
A graphene-toughened nylon 6 composite material was obtained through the above steps. The compounded material was injection molded by an injection molding machine into a standard test strip for mechanical property test. The graphene-toughened nylon 6 composite material was tested to have a notched Izod impact strength of 30.41 $KJ/m^2$ at normal temperature.

Example 8-6

Steps 1-3 are the same as those in Example 1-6.
Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.
Step 5: The premix obtained in Step (4) was melt-blended and extruded through a twin-screw extruder, where the melting temperature was 250° C., and the rotation speed of the screw was 200 rpm.
A graphene-toughened nylon 6 composite material was obtained through the above steps. The compounded material was injection molded by an injection molding machine into a standard test strip for mechanical property test. The graphene-toughened nylon 6 composite material was tested to have a notched Izod impact strength of 30.87 $KJ/m^2$ at normal temperature.

Example 8-7

Steps 1-3 are the same as those in Example 1-7.
Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.
Step 5: The premix obtained in Step (4) was melt-blended and extruded through a twin-screw extruder, where the melting temperature was 250° C., and the rotation speed of the screw was 200 rpm.
A graphene-toughened nylon 6 composite material was obtained through the above steps. The compounded material was injection molded by an injection molding machine into a standard test strip for mechanical property test.
The graphene-toughened nylon 6 composite material was tested to have a notched Izod impact strength of 31.98 $KJ/m^2$ at normal temperature.

Example 8-8

Steps 1-3 are the same as those in Example 1-8.
Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.
Step 5: The premix obtained in Step (4) was melt-blended and extruded through a twin-screw extruder, where the melting temperature was 250° C., and the rotation speed of the screw was 200 rpm.
A graphene-toughened nylon 6 composite material was obtained through the above steps. The compounded material was injection molded by an injection molding machine into a standard test strip for mechanical property test. The graphene-toughened nylon 6 composite material was tested to have a notched Izod impact strength of 32.40 $KJ/m^2$ at normal temperature.

Example 8-9

Steps 1-3 are the same as those in Example 1-9.
Step 4: Nylon 6 was mixed uniformly with the paper ball-like graphene microspheres obtained in Step (3) at a weight ratio of 100:0.2 in a mixer to obtain a nylon 6/graphene premix. Nylon 6 and the graphene microspheres were dried for 12 hrs under vacuum in a vacuum oven at 90° C. before premixing.
Step 5: The premix obtained in Step (4) was melt-blended and extruded through a twin-screw extruder, where the melting temperature was 250° C., and the rotation speed of the screw was 200 rpm.
A graphene-toughened nylon 6 composite material was obtained through the above steps. The compounded material was injection molded by an injection molding machine into a standard test strip for mechanical property test. The graphene-toughened nylon 6 composite material was tested to have a notched Izod impact strength of 29.67 $KJ/m^2$ at normal temperature.
Comparative Example 8-1: Nylon 6 material without graphene. The obtained graphene-toughened nylon 6 composite material was tested to have a notched Izod impact strength of 11.69 $KJ/m^2$ at normal temperature.

Comparative Example 8-2: Direct thermal reduction without chemical reduction (1) A single-layer graphene oxide dispersion prepared by Hummers method was dried by atomization drying at a temperature of 130° C. to obtain graphene oxide microspheres.

(2) The reduced graphene oxide microspheres obtained in Step (1) were transferred to a tubular furnace, and heated to 3000° C. at a ramping rate of 5° C./min and maintained for 1 hr, while a mixed gas of hydrogen and argon was continuously introduced.

(3) Nylon 6 was mixed uniformly with the paper ball-like graphene microspheres obtained in Step (2) at a weight ratio of 100:0.2 in a mixer to obtain a nylon 6/graphene premix. Nylon 6 and the graphene microspheres were dried for 12 hrs under vacuum in a vacuum oven at 90° C. before premixing.

(4) The premix obtained in Step (3) was melt-blended and extruded through a twin-screw extruder, where the melting temperature was 250° C., and the rotation speed of the screw was 200 rpm.

A graphene-toughened nylon 6 composite material was obtained through the above steps, where the graphene appears as a black loose powder, and is microscopically a hollow sphere having a diameter of 1-10 μm. The compounded material was injection molded by an injection molding machine into a standard test strip for mechanical property test. The graphene-toughened nylon 6 composite material was tested to have a notched Izod impact strength of 9.55 KJ/m$^2$ at normal temperature.

The composite material prepared in the present invention was injection molded by an injection molding machine at 230-260° C. according to the ASTM standard. After molding, the sample was allowed to stand for 88 hrs in a standard environment with a temperature of 23±2° C. and a humidity of 50±5%, and then tested in a test environment with a temperature of 23±2° C. and a humidity of 50±5%.

When the paper ball-like graphene microspheres are compounded with nylon 6 matrix, a large specific surface area can enhance the effect of interfacial adhesion between graphene and the matrix, so that the material absorbs more energy when impacted, and a better toughening effect is exerted. However, when the specific surface area is too large, the graphene powder tends to agglomerate and suffers from deteriorated dispersion in the matrix, causing the formation of a stress concentration point to reduce the material performance. In addition, because the pleated structure of the paper ball-like graphene microsphere makes it very flexible, and the more compact the structure of the microsphere is, the less likely it is that the toughness of the material will be damaged due to the large deformation of the microsphere after receiving pressure. Therefore, in practical applications, the method disclosed in the present invention can be used to balance the specific surface area and compactness of the paper ball-like graphene microsphere to prepare a graphene toughener with the optimum effect for improving the impact strength of nylon 6 material. Moreover, graphene also gives the material higher comprehensive properties such as heat resistance, aging resistance and antistatic property, and improves the water absorption, thus widening the scope of application of nylon 6 materials.

What is claimed is:

1. A paper ball-like graphene microsphere, characterized in that the graphene microsphere is formed by pleated single-layer graphene sheets and has a diameter of 500 nm-5 μm, a density of 0.2-0.4 g/cm3, a carbon/oxygen ratio of 20-60, and a specific surface area of less than 200 m2/g, wherein the method for preparing the paper ball-like graphene microsphere comprising the following steps:
   (1) drying a single-layer graphene oxide dispersion by atomization drying to obtain graphene oxide microspheres;
   (2) reducing the graphene oxide microspheres obtained in Step (1) under a reducing gas atmosphere to obtain reduced graphene oxide microspheres; and
   (3) subjecting the reduced graphene oxide microspheres obtained in Step (2) to high-temperature treatment at a temperature that is higher than 1000° C., to obtain ball-like graphene microspheres.

2. A graphene-based lubricating oil, comprising the following components in parts by weight: 100 parts of a base oil, 0.05-1 part of paper ball-like graphene microspheres, and 2-14 parts of additional auxiliary agents, wherein the paper ball-like graphene microsphere comprises pleated single-layer graphene sheets and has a diameter of 500 nm-5 μm, a density of 0.2-0.4 g/cm3, a carbon/oxygen ratio of 20-60, and a specific surface area of less than 200 m2/g.

3. The lubricating oil according to claim 2, wherein the additional auxiliary agents comprises 0.5-1 part of a dispersing agent, 0.5-1.5 parts of a compatilizer, 0.3 to 1 part of a viscosity modifier, 0.2 to 0.5 part of an antifoaming agent, and 0.5 to 10 parts of a preservative.

4. A lithium complex-based grease having paper ball-like graphene microspheres, comprising the following components in parts by weight: 70-90 parts of a base oil, 5-20 parts of a lithium complex-based thickener, 0.05-5 parts of paper ball-like graphene microspheres, and 1-5 parts of additional auxiliary agents, wherein the paper ball-like graphene microsphere comprises pleated single-layer graphene sheets and has a diameter of 500 nm-5 μm, a density of 0.2-0.4 g/cm3, a carbon/oxygen ratio of 20-60, and a specific surface area of less than 200 m2/g, wherein the method for preparing the paper ball-like graphene microsphere comprising the following steps:
   (1) drying a single-layer graphene oxide dispersion by atomization drying to obtain graphene oxide microspheres;
   (2) reducing the graphene oxide microspheres obtained in Step (1) under a reducing gas atmosphere to obtain reduced graphene oxide microspheres; and
   (3) subjecting the reduced graphene oxide microspheres obtained in Step (2) to high-temperature treatment at a temperature that is higher than 1000° C., to obtain ball-like graphene microspheres.

5. The grease according to claim 4, wherein the additional auxiliary agents comprise 0.5-2 parts of an antioxidant, 0-2 parts of a surfactant, and 0.5-1 part of a rust inhibitor.

6. The grease according to claim 4, wherein the lithium complex-based thickener is a complex of a large molecular acid and a small molecular acid reacted with lithium hydroxide, wherein the large molecular acid is a C12-C24 fatty acid, the small molecular acid is one of a C1-C24 fatty acid or boric acid, and the molar ratio of the large molecular acid to the small molecular acid is 1:0.1-2.

7. A compounded rubber modified with paper ball-like graphene microspheres, comprising the following components in parts by weight: 100 parts of a rubber, 0.1-10 parts of paper ball-like graphene microspheres, 0.5-5 parts of a vulcanizing agent, 3-10 parts of a vulcanization accelerator, and 5-20 parts of additional auxiliary agents, wherein the paper ball-like graphene microsphere comprises pleated single-layer graphene sheets and has a diameter of 500 nm-5 μm, a density of 0.2-0.4 g/cm3, a carbon/oxygen ratio of 20-60, and a specific surface area of less than 200 m2/g, wherein the method for preparing the paper ball-like graphene microsphere comprising the following steps:
(1) drying a single-layer graphene oxide dispersion by atomization drying to obtain graphene oxide microspheres;
(2) reducing the graphene oxide microspheres obtained in Step (1) under a reducing gas atmosphere to obtain reduced graphene oxide microspheres; and
(3) subjecting the reduced graphene oxide microspheres obtained in Step (2) to high-temperature treatment at a temperature that is higher than 1000° C., to obtain ball-like graphene microspheres.

8. The compounded rubber according to claim 7, wherein the additional auxiliary agents comprise 2-5 parts of stearic acid, 0.5-2 parts of an anti-aging agent, 0.5-3 parts of liquid paraffin, and 2-10 parts of zinc oxide.

9. A graphene-based waterborne acrylic coating, comprising the following components in parts by weight: 100 parts of an acrylic resin emulsion, 0.1-5 parts of paper ball-like graphene microspheres, 30-60 parts of an inorganic filler, 0.9-12 parts of additional auxiliary agents, and 10-20 parts of water, wherein the paper ball-like graphene microsphere comprises pleated single-layer graphene sheets and has a diameter of 500 nm-5 μm, a density of 0.2-0.4 g/cm3, a carbon/oxygen ratio of 20-60, and a specific surface area of less than 200 m2/g, wherein the method for preparing the paper ball-like graphene microsphere comprising the following steps:
(1) drying a single-layer graphene oxide dispersion by atomization drying to obtain graphene oxide microspheres;
(2) reducing the graphene oxide microspheres obtained in Step (1) under a reducing gas atmosphere to obtain reduced graphene oxide microspheres; and
(3) subjecting the reduced graphene oxide microspheres obtained in Step (2) to high-temperature treatment at a temperature that is higher than 1000° C., to obtain ball-like graphene microspheres.

10. The coating according to claim 9, wherein the acrylic resin emulsion is one or more of a pure acrylic emulsion, a styrene-acrylic emulsion, and a vinyl acetate-acrylic emulsion; and the inorganic filler is one or more of titania, silica, alumina, calcium carbonate, and potassium carbonate.

11. The coating according to claim 9, wherein the auxiliary agents comprise 0.1-0.5 part of a dispersing agent, 0.1-0.3 part of a preservative, 0.1-0.5 part of a film-forming agent, 0.05-0.2 part of a leveling agent, 0.5-10 parts of a thickener, and 0.05-0.5 part of a defoaming agent.

12. A method for improving the impact strength of nylon 6 with paper ball-like graphene, comprising toughening the nylon material by paper ball-like graphene microspheres, wherein the paper ball-like graphene microsphere comprises pleated single-layer graphene sheets and has a diameter of 500 nm-5 μm, a density of 0.2-0.4 g/cm3, a carbon/oxygen ratio of 20-60, and a specific surface area of less than 200 m2/g, wherein the method for preparing the paper ball-like graphene microsphere comprising the following steps:
(1) drying a single-layer graphene oxide dispersion by atomization drying to obtain graphene oxide microspheres;
(2) reducing the graphene oxide microspheres obtained in Step (1) under a reducing gas atmosphere to obtain reduced graphene oxide microspheres; and
(3) subjecting the reduced graphene oxide microspheres obtained in Step (2) to high-temperature treatment at a temperature that is higher than 1000° C., to obtain ball-like graphene microspheres.

13. The method according to claim 12, comprising specifically the following steps:
(1) pre-mixing nylon 6 with graphene microspheres at a weight ratio of 100:0.05-1 in a mixer, to obtain a uniformly mixed nylon 6/graphene premix, wherein nylon 6 and the graphene microspheres are dried in a vacuum oven at 80-105° C. for 8-12 hrs before pre-mixing; and
(2) melt blending and extruding the premix obtained in Step (1) through a twin-screw extruder at a processing temperature of 230-250° C. and a rotation speed of 150-250 rpm, cooling, and granulating to obtain a nylon 6/graphene composite material.

14. A method for preparing a paper ball-like graphene microsphere, comprising the following steps:
(1) drying a single-layer graphene oxide dispersion by atomization drying to obtain graphene oxide microspheres, wherein the single-layer graphene oxide dispersion comprises a reducing agent, where the reducing agent is hydrogen iodide, hydrogen bromide, hydrazine hydrate, vitamin C, or sodium borohydride, and a weight ratio of the reducing agent to the single-layer graphene oxide is 0.1 to 10;
(2) reducing the graphene oxide microspheres obtained in Step (1) under a reducing gas atmosphere to obtain reduced graphene oxide microspheres; and
(3) subjecting the reduced graphene oxide microspheres obtained in Step (2) to high-temperature treatment at a temperature that is higher than 1000° C., to obtain ball-like graphene microspheres.

15. The method according to claim 14, wherein the atomization drying in Step (1) is 100-200° C.

16. The method according to claim 14, wherein the reducing gas atmosphere in Step (2) is one or more of hydrazine hydrate vapor, hydroiodic acid vapor, and hydrobromic acid vapor; and the reducing condition is reducing at 60-200° C. for 30 min to 48 hrs.

17. The method according to claim 14, wherein the temperature for high-temperature treatment in Step (3) is 2500 to 3000° C., and the atmosphere for high-temperature treatment is one of nitrogen, helium, a mixture of hydrogen and argon, and argon, and the treatment time is 30 min to 48 hrs.

* * * * *